United States Patent
Wang et al.

(10) Patent No.: US 10,028,162 B2
(45) Date of Patent: Jul. 17, 2018

(54) METHOD OF CONTROLLING HETEROGENEOUS NETWORK AND RELATED APPARATUSES USING THE SAME

(71) Applicant: Industrial Technology Research Institute, Hsinchu (TW)

(72) Inventors: Hung-Hsiang Wang, Hsinchu County (TW); Yung-Lan Tseng, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 79 days.

(21) Appl. No.: 15/233,956

(22) Filed: Aug. 11, 2016

(65) Prior Publication Data

US 2017/0048738 A1 Feb. 16, 2017

Related U.S. Application Data

(60) Provisional application No. 62/203,931, filed on Aug. 12, 2015.

(51) Int. Cl.
*H04L 12/26* (2006.01)
*H04W 24/10* (2009.01)
*H04W 16/14* (2009.01)
*H04B 17/318* (2015.01)

(52) U.S. Cl.
CPC .......... *H04W 24/10* (2013.01); *H04B 17/318* (2015.01); *H04W 16/14* (2013.01)

(58) Field of Classification Search
CPC ..... H04W 24/10; H04W 16/14; H04B 17/318
USPC .......... 370/252–281, 310–336; 455/450–522
See application file for complete search history.

(56) References Cited

U.S. PATENT DOCUMENTS

| 7,756,058 | B2 | 7/2010 | Cordeiro et al. | |
|---|---|---|---|---|
| 9,125,113 | B2 | 9/2015 | Prasad et al. | |
| 9,184,886 | B2 * | 11/2015 | Bontu | H04L 5/001 |
| 9,198,068 | B1 | 11/2015 | Kim | |
| 9,408,103 | B2 * | 8/2016 | Bai | H04W 24/10 |

(Continued)

FOREIGN PATENT DOCUMENTS

| CN | 104602267 | 5/2015 |
|---|---|---|
| CN | 105208593 | 12/2015 |

OTHER PUBLICATIONS

NEC, "Required functionalities for LTE in unlicensed band," 3GPP TSG RAN WG1 Meeting #78bis, R1-143936, Oct. 6-10, 2014, pp. 1-2.

"Notice of Allowance of Taiwan Counterpart Application," dated Aug. 29, 2017, p. 1-p. 4.

Bhorkar et al., "Medium access design for LTE in unlicensed band," 8th International Wireless Distributed Networks Workshop on Cooperative and Heterogeneous Cellular Networks, Mar. 9, 2015, pp. 369-373.

(Continued)

*Primary Examiner* — Man Phan
(74) *Attorney, Agent, or Firm* — JCIPRNET

(57) ABSTRACT

The disclosure is directed to a method of controlling a heterogeneous network and related apparatuses using the same method. In one of the exemplary embodiments, the disclosure is directed to a method controlling a heterogeneous network applicable to a base station, the method includes not limited to: transmitting a first configuration message comprising a measurement and report rule (MRR) which comprises a first measuring interval, a second measuring interval, a first reporting interval, and a second reporting interval for receiving a measurement report of a channel of an unlicensed spectrum; receiving the measurement report of the channel of the unlicensed spectrum after transmitting the first configuration message; and transmitting a second configuration message to update the MRR.

18 Claims, 23 Drawing Sheets

(56) References Cited

U.S. PATENT DOCUMENTS

| | | |
|---|---|---|
| 2013/0083783 A1 | 4/2013 | Gupta et al. |
| 2013/0084910 A1 | 4/2013 | Suzuki et al. |
| 2014/0044105 A1 | 2/2014 | Bontu et al. |
| 2014/0050086 A1 | 2/2014 | Himayat et al. |
| 2014/0204791 A1 | 7/2014 | Teng et al. |
| 2014/0302865 A1 | 10/2014 | Bai et al. |
| 2015/0063150 A1 | 3/2015 | Sadek et al. |
| 2015/0146561 A1 | 5/2015 | Jung et al. |
| 2015/0189523 A1 | 7/2015 | Michel et al. |
| 2016/0007350 A1 | 1/2016 | Xiong et al. |
| 2016/0135148 A1* | 5/2016 | Novlan .................. H04L 1/00 370/329 |
| 2016/0174095 A1* | 6/2016 | Damnjanovic ....... H04W 36/30 370/252 |
| 2016/0227571 A1* | 8/2016 | Baek ..................... H04W 16/14 |
| 2016/0302098 A1* | 10/2016 | Gheorghiu ............ H04W 24/10 |
| 2016/0302230 A1* | 10/2016 | Novlan ................ H04B 17/318 |
| 2017/0142746 A1* | 5/2017 | Koorapaty ........ H04W 72/1242 |
| 2017/0347270 A1* | 11/2017 | Iouchi ................. H04W 16/14 |

OTHER PUBLICATIONS

Ibars et al., "Channel Selection for Licensed Assisted Access in LTE Based on UE Measurements," IEEE 82nd Vehicular Technology Conference (VTC Fall), Sep. 6-9, 2015, pp. 1-5.

Nikhil Garg et al., "Fair Use and Innovation in Unlicensed Wireless Spectrum," IEEE Technology Policy Associate, Jun.-Aug. 2015, pp. 1-74.

Mukherjee et al., "System architecture and coexistence evaluation of licensed-assisted access LTE with IEEE 802.11," IEEE International Conference on Communication(ICC) Workshop on LTE in Unlicensed Bands: Potentials and Challenges, Jun. 8-12, 2015, pp. 2350-2355.

Qualcomm Technologies, Inc., "Qualcomm Research LTE in Unlicensed Spectrum: Harmonious Coexistence with Wi-Fi," Qualcomm technical white paper, Jun. 2014, pp. 1-19.

Huawei Technologies Co., Ltd., "U-LTE: Unlicensed Spectrum Utilization of LTE," Huawei technical white paper 2014, retrieved on Aug. 11, 2016, pp. 1-20.

* cited by examiner

METHOD OF CONTROLLING HETEROGENEOUS NETWORK AND RELATED APPARATUSES USING THE SAME

CROSS-REFERENCE TO RELATED APPLICATION

This application claims the priority benefits of U.S. provisional application Ser. No. 62/203,931, filed on Aug. 12, 2015. The entirety of the above-mentioned patent application is hereby incorporated by reference herein and made a part of this specification.

TECHNICAL FIELD

The disclosure is directed to a method of controlling a heterogeneous network, a base station using the same method, and a user equipment using the same method.

BACKGROUND

As bandwidth requirement in a wireless communication system continues to increase, the necessity for a user equipment (UE) to utilize both a licensed frequency spectrum and an unlicensed frequency spectrum has increased. However, without coordination from a network, it could be difficult for multiple UEs to share the same unlicensed spectrum. FIG. 1A illustrates a typical wireless network 100 in which a UE 103 utilizes both a licensed spectrum and an unlicensed spectrum. The typical wireless network may include not limited to an eNB 101, a licensed assisted access (LAA) node (LAA-node), and a user equipment 103. The UE 103 would exchange data and control information with the eNB 101 through a licensed frequency band F1 which requires authorization by the eNB 101 for access. The eNB 101 may also transmit packets over the unlicensed frequency spectrum F2 to the UE 103.

The procedures for the eNB 101 to enable packets transmission over the unlicensed frequency band have been known as Licensed Assisted Access (LAA). In FIG. 1A, the eNB 101 may assigns the LAA Node 102 to exchanges data and/or control information with UE 103 in the unlicensed frequency spectrum F2. In some scenarios, the LAA Node 102 could be an independent entity which is physically separated from eNB 101 but utilizes a wired or wireless backhaul connection to communicate with the eNB 101. In other scenarios, the LAA Node 102 may also be a logical entity which is co-located with the eNB 101 (or physically situated within the eNB 101). Since the un-licensed frequency spectrum F2 would also be open to other UEs and other radio access technologies (RATs) for use, various regulations could be applied as for how the un-licensed bands F2 could be utilized in different countries or regions.

In some countries or regions, regulations may require the LAA Node 102 or the UE 103 to implement a "listen-before-talk" mechanism before delivering packets in the LAA-downlink (LAA-DL) or LAA-uplink (LAA-UL) direction. The LAA-DL path means that the LAA Node 102 would deliver packets to the UE 103 through one or more LAA channels over the unlicensed frequency band F2, and the LAA-UL path means that the UE 103 may deliver packets to LAA Node 102 through one or more LAA channels over the licensed frequency band F2.

Referring to FIG. 1A and FIG. 1B together, to transmit packets in the LAA-UL path, the UE 103 may periodically determine the channel condition of one LAA channel during a clear channel assessment (CCA) interval 111 which may occur periodically. In response to performing a CCA, the UE 103 would not transmit via unavailable channels 112 and would instead transmit via available channels 113. When the UE 103 detects a clean LAA channel during the CCA intervals 111a 111b, the UE 103 would start packet transmissions 114 in a clean LAA channel. A clean LAA channel could be defined as the average signal strength of interferences within a CCA interval being lower than a predefined threshold, which could be related to the hardware capability of the UE 103.

As shown in FIG. 1B, a UE in general may perform a CCA procedure in each of the CCA intervals 111 to ensure that there is no other radio signal transmission which may cause interference over a LAA channel. In each of the CCA intervals 111, a UE may perform a passive scan to detect energy level of any potential interference signal in the LAA channel. The validity of energy detection may depend on the sensitivity of the RF module on a LAA node or UE and may consequently influence the CCA range of a LAA Node/UE. A UE typically would not deliver packets when the UE has determined that a LAA channel has been occupied, which means that the average detected signal strength of an interference signal during a CCA interval has exceeded a predefined threshold. As shown in FIG. 1B, a UE would not transmit packets during idle periods 115 before a next CCA interval. In addition, the maximum time span of a packet transmission may also depend on regional regulations or regulations of different countries. In general, An LAA Node would also implement the same CCA and maximum time span for data transmission in the LAA-DL packet transmission as previously described.

FIG. 1C illustrates a part of an unlicensed band in U.S., India, Japan, Europe, and China. As shown in FIG. 1C, an un-licensed band would include a plurality of carrier frequencies and could be synonymous with LAA channels in this disclosure. Many countries may have regulations about the range of unlicensed bands in the frequency spectrum. Typically, an eNB may determine LAA channel selections for a LAA Node or UE to deliver user data in an unlicensed band. Before a LAA channel selection, a UE would measure and/or report the channel conditions of one or more LAA channels in the unlicensed band to the eNB, and thus the eNB would be able to procure the necessary information to select one or more LAA channels for a LAA-DL transmission.

There are many parameters that could be measured and/or reported by a UE or LAA node, such as the RSSI (Received Signal Strength indicator), RSRP (Reference Signal Received Power), RSRQ (Reference Signal Received Quality) level of the LAA channels, and etc. The $RSSI_{LAA}$ parameter is measured by a UE and indicates the average total received power in the LAA channel. For, the $RSRP_{LAA}$ parameter, the RSRP is a RSSI type of measurement. An LAA Node would periodically broadcast reference signals, such as discovery reference signals (DRS) of LTE, in the occupied LAA channel. Subsequently, a UE would be able to measure the power of the LTE Reference Signals spread over the LAA channel. The measurement approaches of $RSRP_{LAA}$ could be similar to the measurement approaches of RSRP in the LTE licensed band. The $RSRQ_{LAA}$ parameter indicates the received signal quality of the LAA channel. $RSRQ_{LAA}$ may be proportional (or equivalent) to the ratio of RSRP and RSSI over the LAA channel.

For the LAA, a UE would need to measure and report LAA channel conditions to an eNB for LAA channel selection. FIG. 1D illustrates an example of $RSSI_{LAA}$ measurement and report. Typically, a UE would perform a $RSSI_{LAA}$ measurement in order to detect other (hidden) network terminals or nodes. In this example, the UE would perform measurements at subframes 1, 41, and 81. The measurement interval 121 is the duration between subframes 1 and 41. The report interval 122 is the duration between subframes 1 and 121 as the UE would report to the eNB at sub frame 121 for the average RSSI values measured in each symbol of the subframes 1, 41, and 81.

The LAA channel measurement and report could be triggered periodically because the source of interferences may appear in LAA channels in an unpredictable manner. Moreover, a UE may need to measure multiple LAA channels since there could be many candidate LAA channels for an eNB to select. It is noted that the LAA Node could also measure LAA channel conditions and report such to an eNB. For a LAA-DL packet transmission, a LAA Node may also provide a LAA_Node measurement report to an eNB for LAA channel selection. Subsequently, an eNB may also obtain LAA channel conditions from both the "LAA_Node measurement report" and "LAA_UE measurement report". The contents of a "LAA_Node measurement report" could be the same as that of a "LAA_UE measurement report". Moreover, the same information such as information of a neighbor interfering node (as indicated by the $RSSI_{LAA}$ of a LAA channel) may also be covered by the LAA_Node measurement and LAA_UE measurement report when one interfering node interferences both the LAA Node and UE. Therefore, it might not be necessary for a UE to report all the LAA channel conditions when it is relatively close to the LAA Node. Based on the above described observation, the mechanism of measurement reporting and reporting rules could be enhanced in order for a UE to decrease the overhead of LAA channel measurements and reports.

SUMMARY OF THE DISCLOSURE

Accordingly, the present disclosure is directed to a method of controlling a heterogeneous network, a base station using the same method, and a user equipment using the same method.

In one of the exemplary embodiments, the disclosure is directed to a method controlling a heterogeneous network applicable to a base station, the method includes not limited to: transmitting a first configuration message comprising a measurement and report rule (MRR) which comprises a first measuring interval, a second measuring interval, a first reporting interval, and a second reporting interval for receiving a measurement report of a channel of an unlicensed spectrum, wherein the first measuring interval is longer than the second measuring interval, and the first reporting interval is longer than the second reporting interval; receiving the measurement report of the channel of the unlicensed spectrum after transmitting the first configuration message; and transmitting a second configuration message to update the MRR.

In one of the exemplary embodiment, the disclosure is directed to a method controlling a heterogeneous network applicable to a user equipment, the method includes not limited to: receiving a first configuration message comprising a measurement and report rule (MRR) which comprises a first measuring interval, a second measuring interval, a first reporting interval, and a second reporting interval for transmitting a measurement report of a channel of an unlicensed spectrum, wherein the first measuring interval is longer than the second measuring interval, and the first reporting interval is longer than the second reporting interval; transmitting the measurement report of the channel of the unlicensed spectrum in response to receiving the first configuration message; and receiving a second configuration message to update the MRR.

In one of the exemplary embodiment, the disclosure is directed to a base station which includes not limited to: a transmitter; a receiver; and a processor coupled to the transmitter and the receiver and is configured at least for: transmitting a first configuration message comprising a measurement and report rule (MRR) which comprises a first measuring interval, a second measuring interval, a first reporting interval, and a second reporting interval for receiving a measurement report of a channel of an unlicensed spectrum, wherein the first measuring interval is longer than the second measuring interval, and the first reporting interval is longer than the second reporting interval; receiving the measurement report of the channel of the unlicensed spectrum after transmitting the first configuration message; and transmitting a second configuration message to update the MRR.

In one of the exemplary embodiment, the disclosure is directed to a user equipment which includes not limited to: a transmitter; a receiver; and a processor coupled to the transmitter and the receiver and is configured at least for: receiving a first configuration message comprising a measurement and report rule (MRR) which comprises a first measuring interval, a second measuring interval, a first reporting interval, and a second reporting interval for transmitting a measurement report of a channel of an unlicensed spectrum, wherein the first measuring interval is longer than the second measuring interval, and the first reporting interval is longer than the second reporting interval; transmitting the measurement report of the channel of the unlicensed spectrum after receiving the first configuration message; and receiving the second configuration message to update the MRR.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
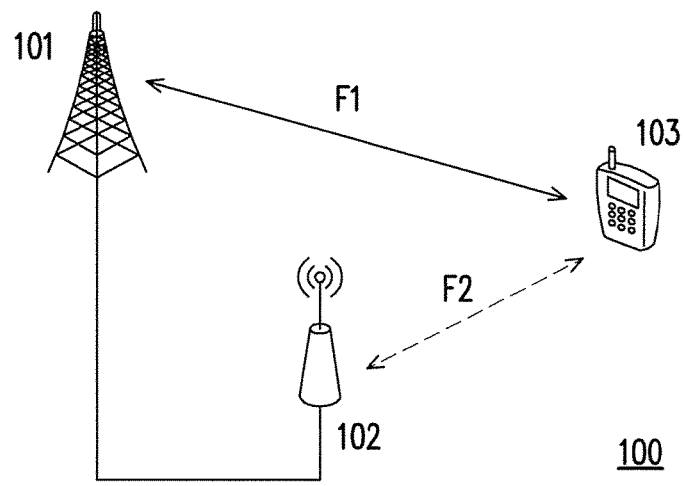
FIG. 1A illustrates a typical wireless network in which a UE may utilize both a licensed spectrum and an unlicensed spectrum.
Figure 1B:
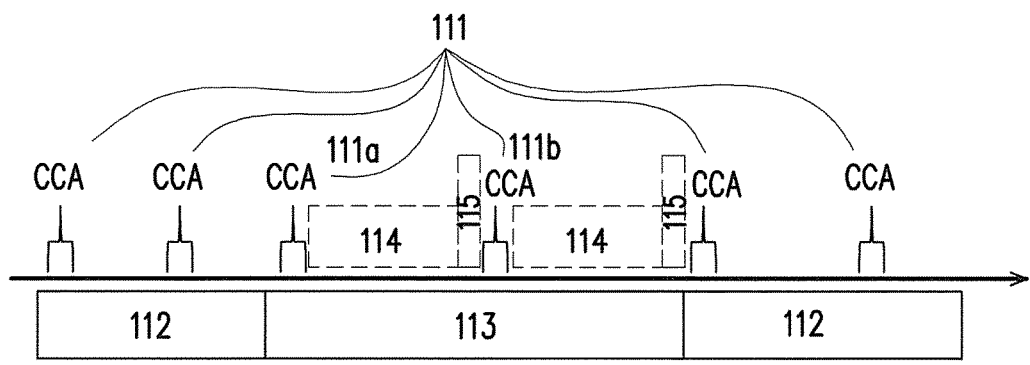
FIG. 1B illustrates the mechanism of clear channel assessment (CCA) of an unlicensed frequency spectrum.
Figure 1C:
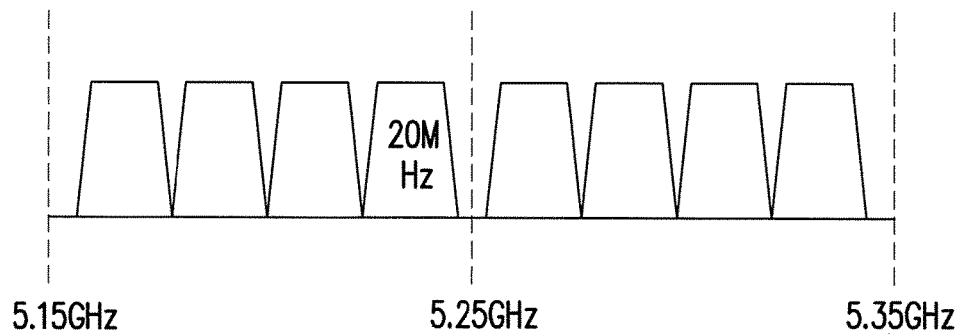
FIG. 1C illustrates a part of LAA channels in an unlicensed spectrum in various countries.
Figure 1D:
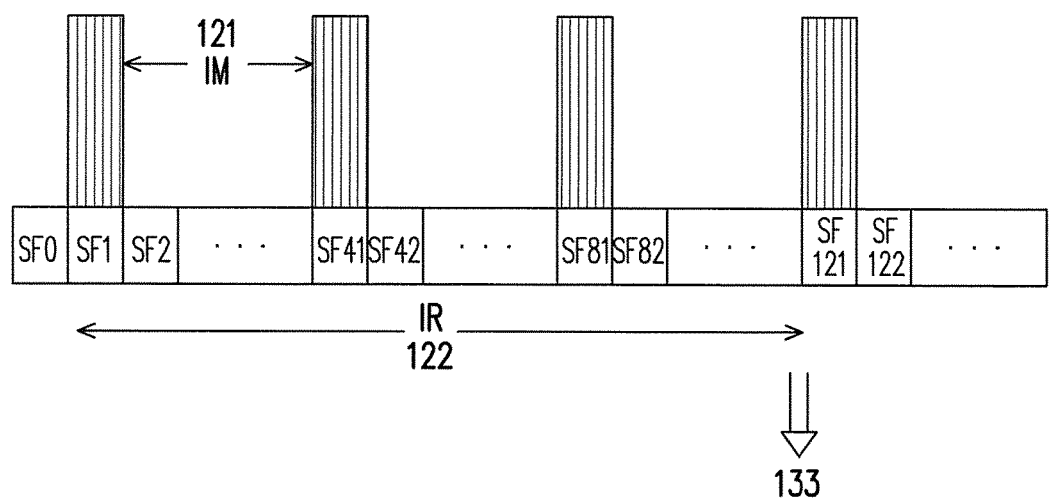
FIG. 1D illustrates an example of $RSSI_{LAA}$ measurement and report.

Reference will now be made in detail to the present exemplary embodiments of the disclosure, examples of which are illustrated in the accompanying drawings. Wherever possible, the same reference numbers are used in the drawings and the description to refer to the same or like parts.

Figure 2A:
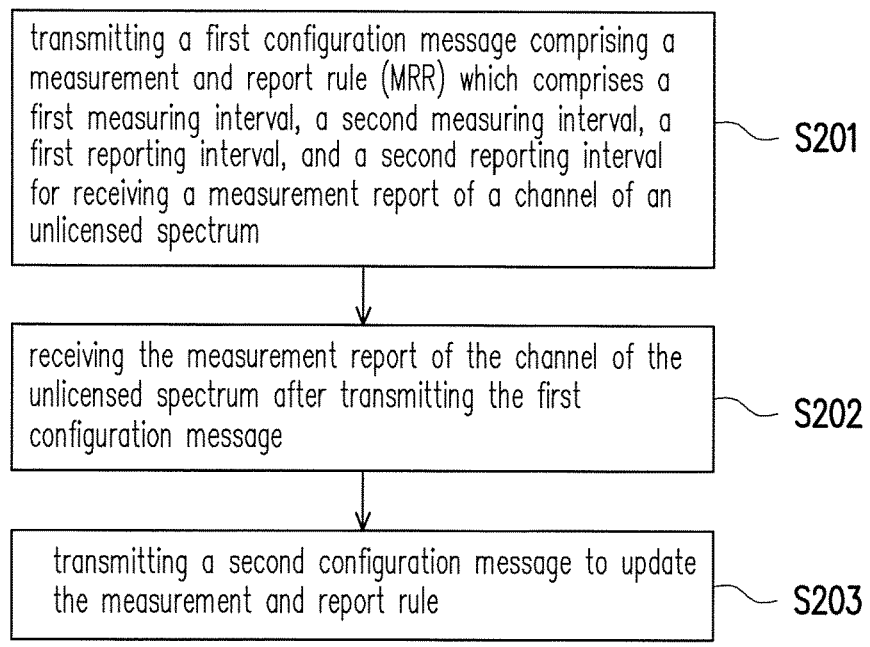
FIG. 2A illustrates a method controlling a heterogeneous network from the perspective of a base station in accordance with one of the exemplary embodiments of the disclosure.

In this disclosure, a method of controlling a heterogeneous network and related apparatuses using the same method is provided. FIG. 2A illustrates a method controlling a heterogeneous network from the perspective of a base station in accordance with one of the exemplary embodiments of the disclosure. In step S201, the base station would transmit a first configuration message comprising a measurement and report rule (MRR) which comprises a first measuring interval, a second measuring interval, a first reporting interval, and a second reporting interval for receiving a measurement report of a channel of an unlicensed spectrum. In step S202, the base station would receive the measurement report of the channel of the unlicensed spectrum after transmitting the first configuration message. In step S203, the base station would transmit a second configuration message to update the measurement and report rule.

Figure 2B:
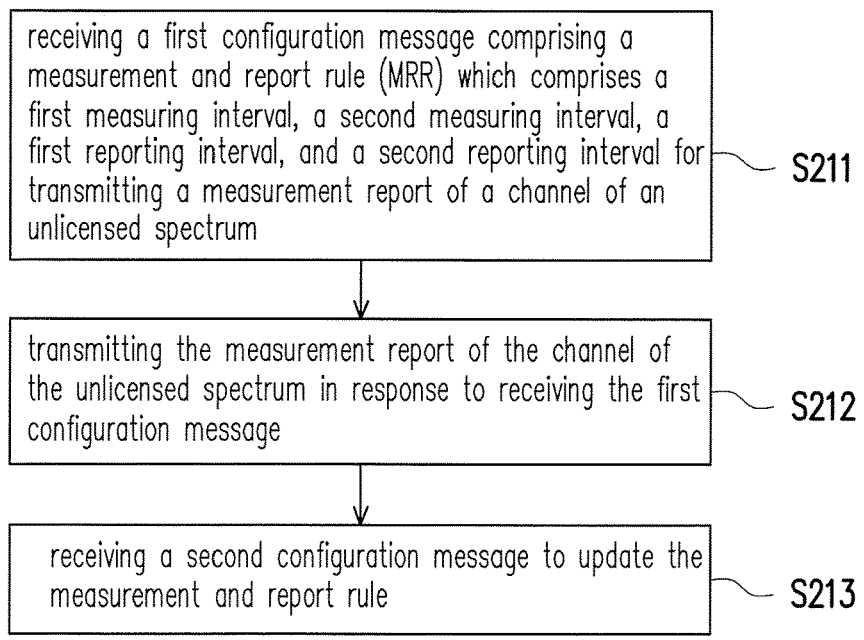
FIG. 2B illustrates a method controlling a heterogeneous network from the perspective of a user equipment in accordance with one of the exemplary embodiments of the disclosure.

FIG. 2B illustrates a method controlling a heterogeneous network from the perspective of a user equipment in accordance with one of the exemplary embodiments of the disclosure. In step S211, the user equipment would receive a first configuration message comprising a measurement and report rule (MRR) which comprises a first measuring interval, a second measuring interval, a first reporting interval, and a second reporting interval for receiving a measurement report of a channel of an unlicensed spectrum. In step S212, the user equipment would transmit the measurement report of the channel of the unlicensed spectrum in response to receiving the first configuration message. In step S213, the user equipment would receive a second configuration message to update the measurement and report rule.

Figure 3A:
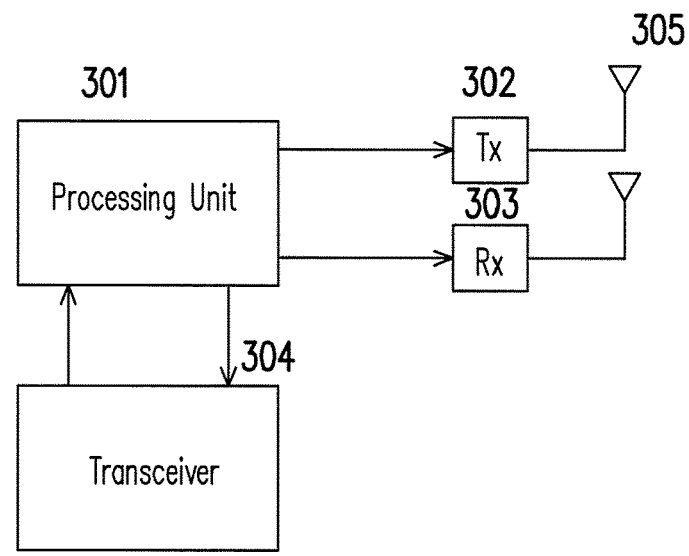
FIG. 3A illustrates an exemplary base station in terms of functional block diagram in accordance with the disclosure.

FIG. 3A illustrates an exemplary base station in terms of functional block diagram in accordance with the disclosure. The base station would include not limited to a processing unit 301 electrically coupled to a transmitter 302, a receiver 303, and an inter-base station transceiver 304. The transmitter 302 contains circuits for transmitter wireless signal in the licensed spectrum, and the receiver 303 contains circuits for receiving wireless in the licensed spectrum. The inter-base station transceiver 304 contains a transmitter and a receiver for communicating with another base station or access point such as a LAA node as previously described. The processing unit 301 contains one or more processors and processes digital signal and to perform the proposed of controlling a heterogeneous network as described in FIG. 2A as well as subsequently described exemplary embodiments of the disclosure. The functions of the processing unit 301 could be implemented by using one or more processors. A processor could be a programmable unit such as a microprocessor, a micro-controller, digital signal processor (DSP) chips, a field-programmable gate array (FPGA), etc. The functions of a processor may also be implemented with one or several electronic devices or ICs. In other words, the functions performed by the processor could be implemented within the domains of either hardware or software or a combination of both.

Figure 3B:
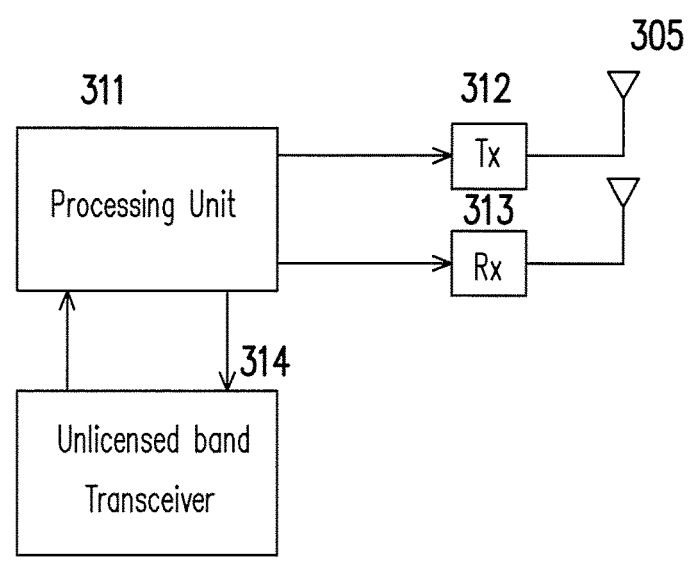
FIG. 3B an exemplary user equipment in terms of functional block diagram in accordance with the disclosure.

FIG. 3B an exemplary user equipment in terms of functional block diagram in accordance with the disclosure. The user equipment would include not limited to a processing unit 311 electrically coupled to a transmitter 312, a receiver 313, and an unlicensed band transceiver 314 (e.g. Wi-Fi, Bluetooth, and etc.). The transmitter 312 contains circuits for transmitter wireless signal in the licensed spectrum, and the receiver 313 contains circuits for receiving wireless in the licensed spectrum. The unlicensed band transceiver 314 contains a transmitter and a receiver for communicating with another base station or access point such as a LAA node as previously described. The processing unit 311 contains one or more processors and processes digital signal and to perform the proposed of controlling a heterogeneous network as described in FIG. 2B as well as subsequently described exemplary embodiments of the disclosure. The functions of the processing unit 311 could be implemented by using one or more processors. A processor could be a programmable unit such as a micro-processor, a microcontroller, digital signal processor (DSP) chips, a field-programmable gate array (FPGA), etc. The functions of a processor may also be implemented with one or several electronic devices or ICs. In other words, the functions performed by the processor could be implemented within the domains of either hardware or software or a combination of both. In embodiments, the eNB receives the measurement report comprises at least one of a received signal strength indicator (RSSI) measurement of the channel of the unlicensed spectrum, a RSRP measurement of the channel of the unlicensed spectrum, and a RSRQ measurement of the channel of the unlicensed spectrum.

Figure 4:
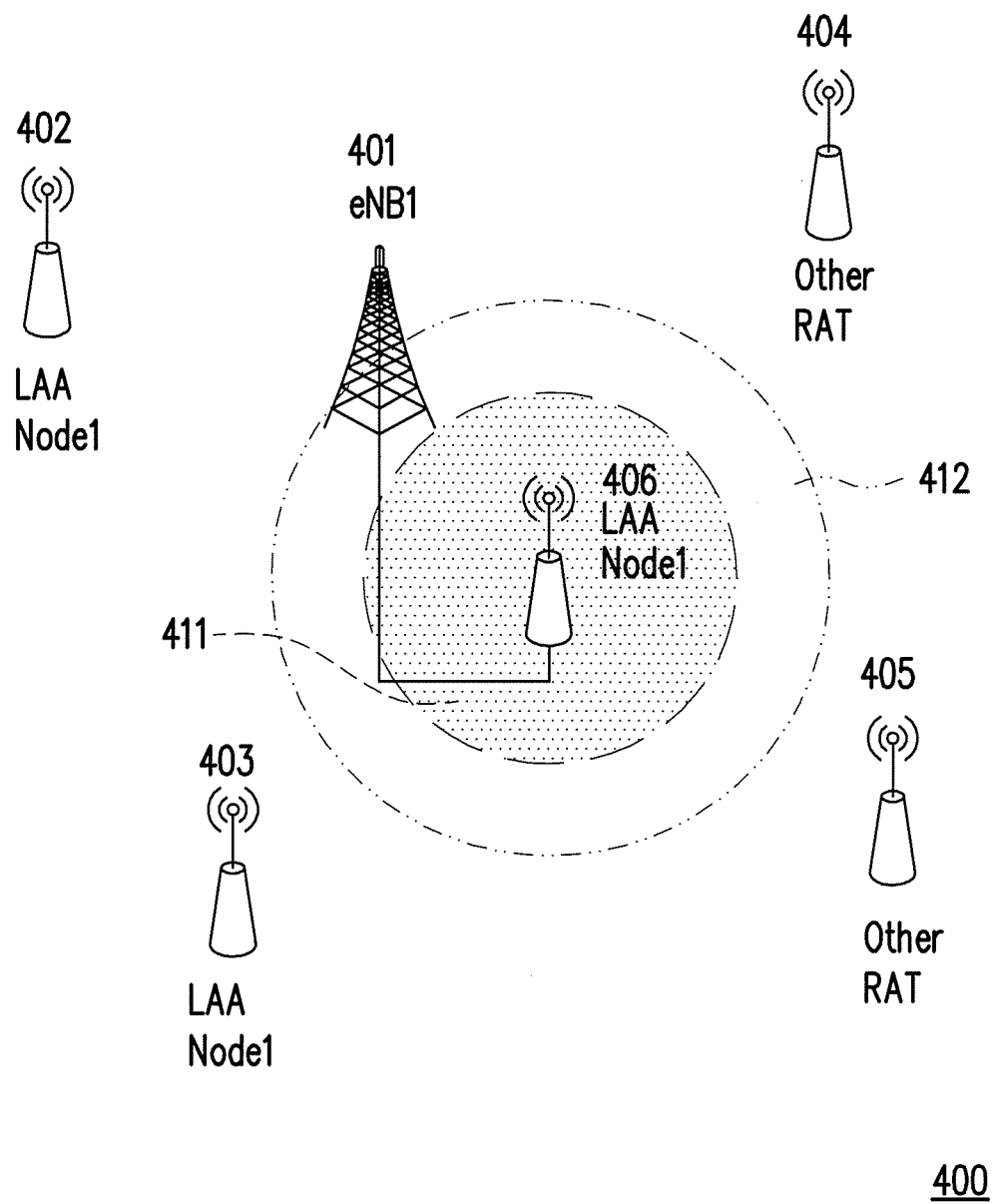
FIG. 4 illustrates an example of a heterogeneous network related to the proposed method of controlling a heterogeneous network.

FIG. 4 illustrates an example of a heterogeneous network for elucidating a concept related to the proposed method of controlling a heterogeneous network 400. The network 400 may include not limited to an eNB 401, a LAA node 406 which could be connected to the eNB 401 via a backhaul connection, other LAA nodes 402 403, and base stations or access points of other radio access technologies (other RAT) 404 405. The LAA node 406 could be an access point which operates in an unlicensed frequency spectrum. A UE (not shown) inside a first range 411 may communicate with the eNB 401 in a licensed frequency spectrum or with the LAA node 406 in an unlicensed spectrum. The network 400 is heterogeneous in the sense that there are different radio access technologies which operates within the same network as the LAA node 406 communicates in unlicensed bands and operates under different communication protocols from the eNB 401 which communicates in licensed bands and operates under a different protocol such as LTE or 4G.

For LAA, the UE may derive $RSRP_{LAA}$ value or $RSRQ_{LAA}$ value based on the reference signals broadcasted by the LAA Node 406 in a LAA channel. By detecting the $RSRP_{LAA}$ value, the UE would be able to identify the 'logical' radio distance between the UE and the LAA Node 406 so as to determine whether the UE is close to the LAA Node 406 or not. Also the UE may derive the $RSSI_{LAA}$ of an unlicensed channel by passively scanning the energy of that particular channel. For LAA, the eNB 401 may need to configure or update a measurement and report rules (MRR) for the UE to monitor the conditions of a LAA channel. In other words, the eNB 401 may provide the LAA measurement and report rules (LAA-MRR) to one or more UEs within the range of the eNB.

One of the objectives of the LAA-MRR would be to reduce the signaling overhead of the UE to measure and/or report the LAA channel conditions to eNB 401. For example, the signaling overhead required to report a LAA channel condition could be reduced by simply letting the UE to relay measurement results performed by the LAA Node 406 to the eNB 401. In this way, it would not be necessary for the UE to perform LAA channel measurements and/or to report the measurements frequently if the UE is close to the LAA Node 406. For example, if the UE is within the first range 411, the range of the LAA node 406, the UE would perform measurement and/or report according a particular set of rules or criteria. If the UE is within a second range 412, the UE would perform measurement and/or report according a different set of rules or criteria since the second range 412 could be prone to inferences from other LAA nodes 402 403 or other RATs 404 405.

Figure 5A:
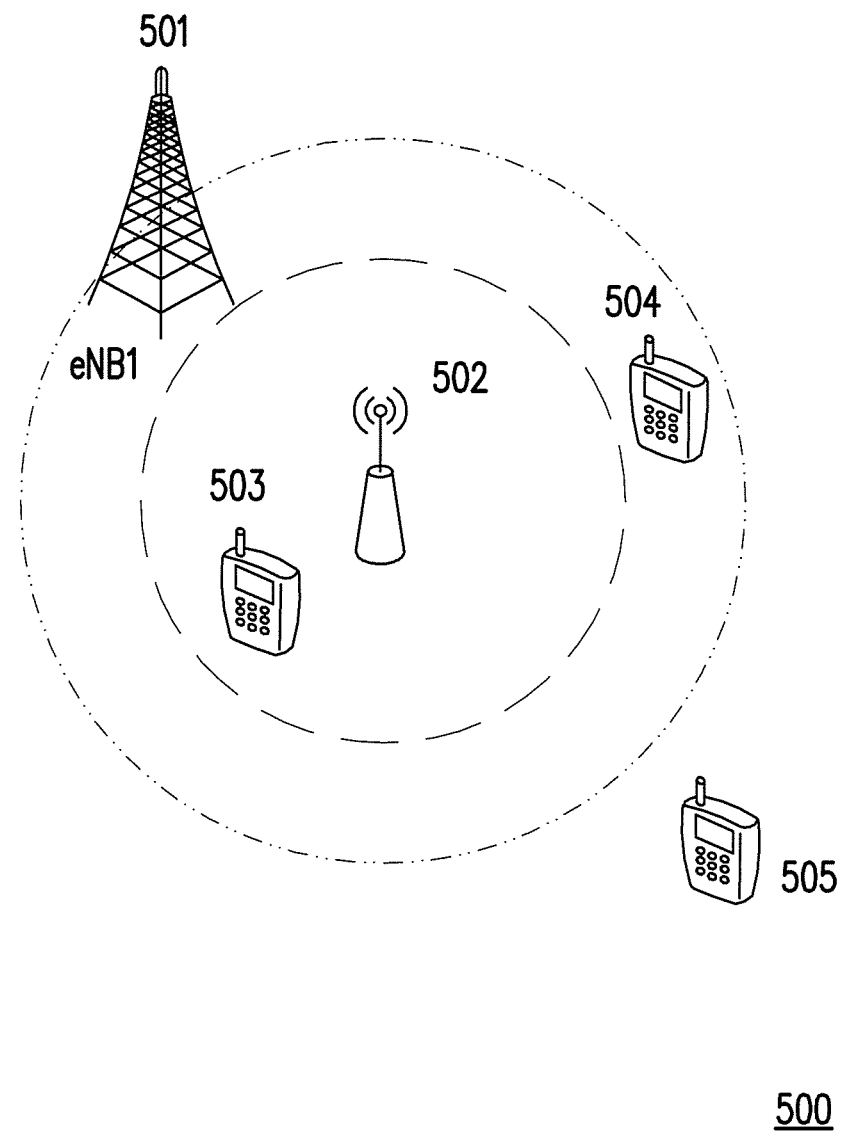
FIG. 5A illustrates a heterogeneous network which implements the proposed method of controlling a heterogeneous network in accordance with one of the exemplary embodiments of the disclosure.

FIG. 5A illustrates a heterogeneous network which implements the proposed method of controlling a heterogeneous network in accordance with one of the exemplary embodiments of the disclosure. The network may include not limited to an eNB 501, a LAA node 502 which could be connected to the eNB 501 via a backhaul connection or an inter-base station connection and multiple UEs 503 504 505 which could be served by the eNB 501 through a licensed spectrum or and/or by the LAA 502 through an unlicensed spectrum. The eNB 501 could adjust parameters used in a LAA-MRR based on a measurement report from the LAA Node 502 or LAA_UE measurement report(s) from UEs 503 504 505. After parameters of LAA-MRR have been initialized or re-configured, the eNB 501 would deliver the LAA-MRR to the UEs 503 504 505. In response to the LAA-MRR received, each of the UE 503 504 505 may implement measurement/report based on its radio distance from the LAA node 502. The radio distance could defined as the distance of a radio wave travelled between two locations such as the distance between a UE 503 and the LAA node 502, and thus the radio distance could be represented as the measured $RSRP_{LAA}$ value by the UE 503 from the LAA node 502.

If a UE is close to the LAA node 502 such as the UE 503, the UE 503 may select a longer reporting interval out of multiple reporting intervals as defined by the LAA-MRR and thus the UE 503 does not need to report LAA channel measurement results frequently. The UE 503 would then transmit to a measurement report of LAA channel to the eNB 501 (through the LAA node 503) with the longer reporting interval as selected. The reason is that the LAA node 502 has already measured its surroundings and hence duplications of efforts from UEs are unnecessary. A UE having a longer distance from the LAA node 502 such as the UE 504 would transmit measurement reports to the eNB 501 (through the LAA node 502) with a shorter interval due to the longer distance between the UE 504 and the LAA Node 502. A UE such as UE 505 would not provide a LAA channel measurement report to the eNB 501 if it is out of the service range of LAA Node 502.

It is worth noting that the eNB 501 would be able to provide access control to the LAA Node 502 by adjusting a $RSRP_{LAA}$ threshold for UEs 503 504 505 to determine whether to report or not to report the LAA_UE measurement report when any of the UEs 503 504 505 detects that the RSRP value of the LAA Node 502 is under the given $RSRP_{LAA}$ threshold. For example, by not doing so, the UE 505 would not provide a LAA_UE measurements report about the LAA Node 502 and the thus the UE 505 would not be served by the LAA Node 505. In this way, the eNB 501 would be able to control the loading of LAA Node 502 by adjusting the $RSRP_{LAA}$ threshold. It is also worth noting that the eNB 501 may configure the UEs 503 504 505 to not implement any measurement report by setting any of the shorter reporting interval and longer reporting interval to an infinity value.

In addition to the radio distance being a factor, it would also not necessary for any UEs 503 504 505 to monitor and/or report the conditions of unlicensed channels frequently if no significant environment changes, such as no/low interference or low interference variance situations, etc. has been observed. In order to achieve the objective of a LAA-MRR, a LAA-MRR in general may include not limited to the following parameters: $\{T_{LAA\_rpt}, T_{I\_RSSI}, \Delta_{RSSI}, I_M, I_R\}$, wherein the $T_{LAA\_rpt}$ parameter may include RSRP or RSRQ threshold(s) configured by an eNB for UEs to perform measurement and/or reporting. The UE may then perform measurements to derive the RSRP or RSRQ result of a LAA channel (i.e. $RSRP_{LAA}/RSRQ_{LAA}$ result) and compare the results with the received RSRP or RSRQ threshold(s). The $T_{I\_RSSI}$ parameter may include a $RSSI_{LAA}$ threshold for a UE to perform $RSSI_{LAA}$ measurement and to compare the $RSSI_{LAA}$ measurement with the $RSSI_{LAA}$ result. The $\Delta_{RSSI}$ parameter is a $RSSI_{LAA}$ variation threshold for UEs to calculate the $RSSI_{LAA}$ variance from consecutive $RSSI_{LAA}$ measurements and compare the calculated $RSSI_{LAA}$ variance with the $RSSI_{LAA}$ variation threshold.

The $\{I_R, I_M\}$ parameters are flexible intervals for UEs to perform reporting and/or measurement respectively. In particular, the $I_M$ parameter stands for a measurement interval (e.g. 121) for measuring the channel quality of a LAA channel in an unlicensed frequency spectrum. The $I_M$ parameter may be further be divided into the measurement intervals of $RSSI_{LAA}$ ($I_{M,RSSI}$), $RSRP_{LAA}$ ($I_{M,RSRP}$), and $RSRQ_{LAA}$ ($I_{M,RSRQ}$). The $RSSI_{LAA}$ ($I_{M,\ RSSI}$)/$RSRQ_{LAA}$ ($I_{M,\ RSRQ}$)/$RSRP_{LAA}$ ($I_{M,\ RSRP}$) parameters stand for RSSI/RSSQ/RSRP level respectively measured by a UE over LAA channel(s) with measurement interval $I_M$. The $I_R$ parameter stands for the reporting interval for a UE to report the channel quality of a LAA channel in an unlicensed spectrum. The $I_R$ parameter could be further divided into the measurement intervals of $RSSI_{LAA}$ ($I_{R,RSSI}$), $RSRP_{LAA}$ ($I_{R,RSRP}$), and $RSRQ_{LAA}$ ($I_{R,RSRQ}$). In addition to $I_R$ and $I_M$, a UE may decide whether to report $RSSI_{LAA}$ measurements based on the $\{T_{I\_RSSI}, \Delta_{RSSI}\}$ parameters which reflect the conditions that a UE has observed no/low interference or low interference variance situations respectively.

Figure 5B:
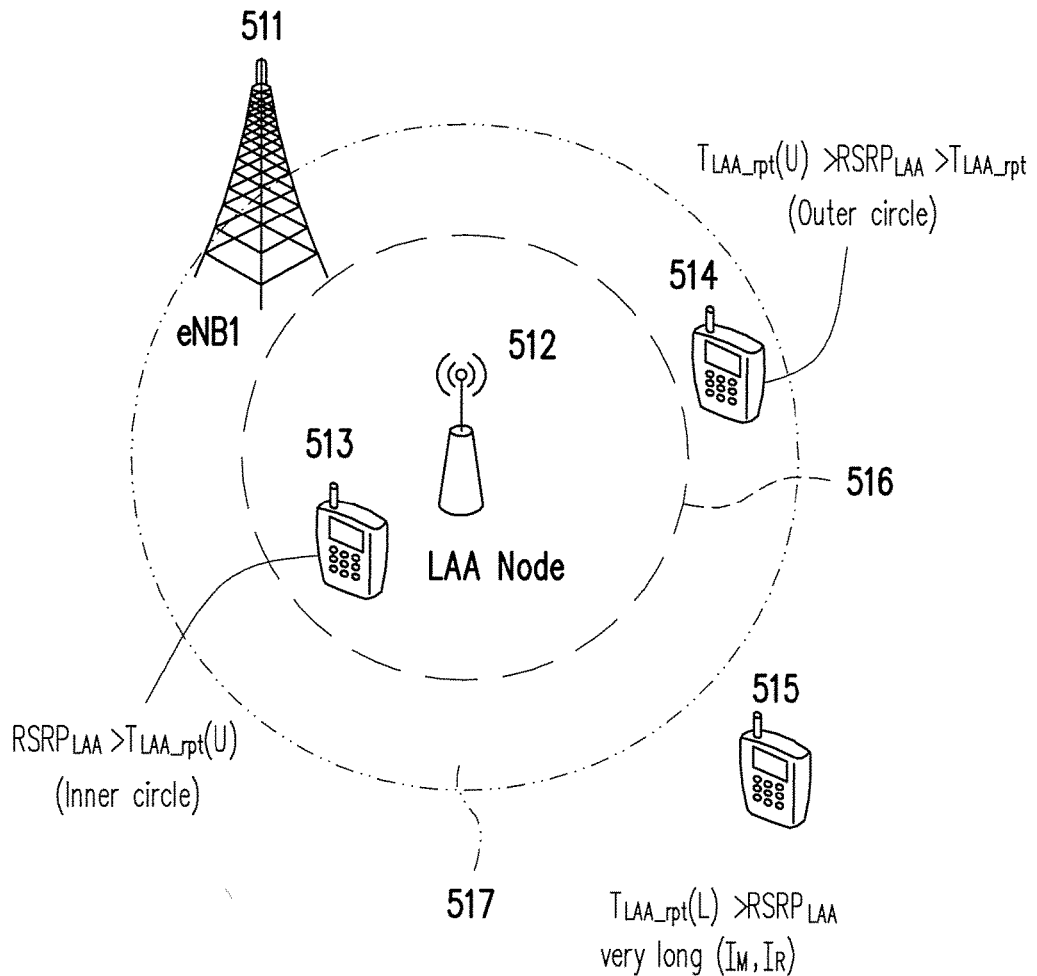
FIG. 5B illustrates a heterogeneous network similar to FIG. 5A in further detail.

FIG. 5B illustrates a heterogeneous network similar to FIG. 5A in further detail. The eNB 511 may first transmit (through the LAA node 512) a LAA-MRR with parameters not limited to one or more $\{T_{LAA\_rpt}, T_{I\_RSSI}, \Delta_{RSSI}, I_M, I_R\}$ parameters as previously described. The LAA-MRR may include a first $I_M$, a second $I_M$, a first $I_R$, and a second $I_R$, wherein the first $I_M$ and the first $I_R$ (e.g. 520) has a longer interval than the second $I_M$ and the second $I_R$ (e.g. 521). Upon receiving the LAA-MRR, a UE may perform a $RSRP_{LAA}$ measurement and compare the $RSRP_{LAA}$ measurement to the received thresholds as defined by the LAA-MRR parameters. Optionally, a UE may also be configured by the LAA-MRR to have a choice to select a third $I_M$ and a third $I_R$ (e.g. 522). The RSRP threshold comprises an upper RSRP threshold and a lower RSRP threshold. For example if the measured $RSRP_{LAA}$ by the UE 513 is greater than the upper threshold of $T_{LAA\_rpt}$ ($T_{LAA\_rpt}$(U)), then the UE 513 would be considered as being within an inner circle 516 and thus being close to the LAA node 512. In this case, the UE 513 would then select the longer $I_M$ and longer $I_R$ (e.g. 520), which is the first $I_M$ and the first $I_R$ as described. For example, if the measured $RSRP_{LAA}$ by the UE 514 is greater than $T_{LAA\_rpt}$(U) but lower the lower threshold of $T_{LAA\_rpt}$ ($T_{LAA\_rpt}$(L)), then the UE 512 would be considered as being within an outer circuit 512 but outside the inner circle 516 and thus may select the shorter $I_M$ and shorter $I_R$ (e.g. 521).

For example, if the measured $RSRP_{LAA}$ by the UE 515 is lower than $T_{LAA\_rpt}$(L), then the UE 515 would be considered as being outside the outer circuit 517 and thus may select the very long $I_M$ (third $I_M$) and very long $I_R$ (third $I_R$) (e.g. 522) and thus would report the $RSRP_{LAA}$ to the eNB 511 after a very long interval or not report the $RSRP_{LAA}$ at all.

Figure 6:
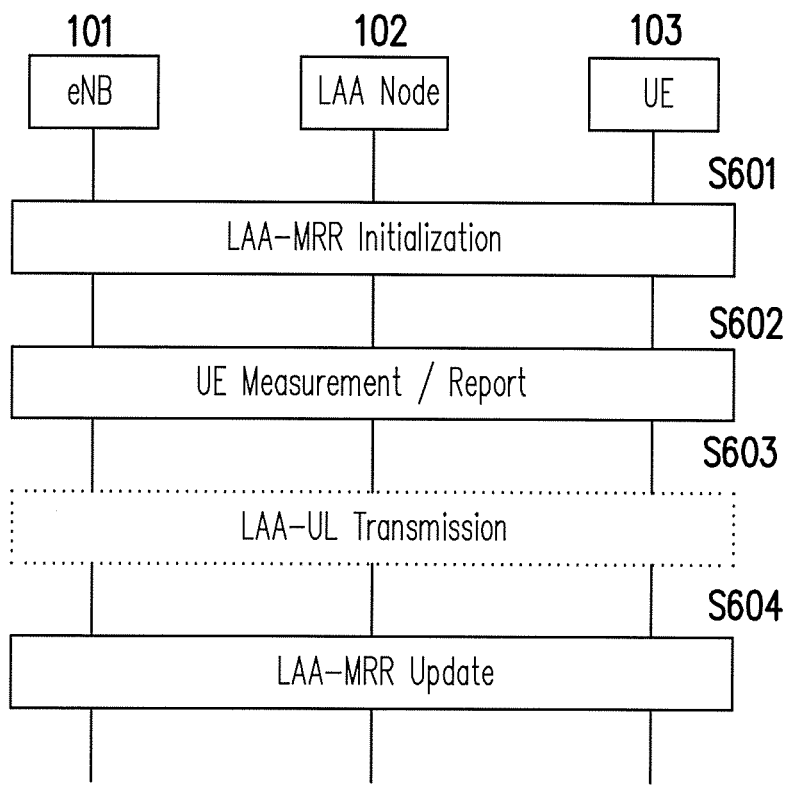
FIG. 6 illustrates a signal flow diagram of configuring a LAA-MRR in accordance with one of the exemplary embodiments of the disclosure.

FIG. 6 illustrates a signal flow diagram of configuring a LAA-MRR in accordance with one of the exemplary embodiments of the disclosure. The LAA-MRR configuration progress may include not limited to these following steps. In step S601, an eNB (e.g. 101) may initialize a LAA-MRR configuration to a UE (e.g. 103) and transmit a LAA-MRR in a configuration message to the UE (through the LAA node (e.g. 102)). The initial LAA-MRR values could be determined by the eNB 101 in two ways. First, the initial LAA-MRR values could be determined based on the capability of the LAA Node 102. For example, the initial value could be derived based on the radio signal sensitivity level of LAA Node 102 or measurement report of LAA Node 102. The LAA_Node measurement report would be provided by the LAA Node 102 and be reported to the eNB 101. Second, the initial LAA-MRR values could be determined based on a LAA_UE measurement report(s). In this way, the eNB 101 may collect measurement result(s) from the UE 103 and then configure the initial values of LAA-MRR accordingly.

In step S602, the UE 103 may perform necessary measurements on LAA channels based on parameters of the LAA-MRR and transmits a LAA_UE measurement report to the eNB 101. Based on the LAA_UE measurement report, the eNB 101 may configure appropriate LAA channel(s) for the LAA Node 102 and the UE 103 to deliver data. In the optional step S603, the eNB 101, LAA node 102, and the UE 103 may communicate data back and forth. In step S604, the eNB 101 may update the LAA-MRR for the UE 103 based on the latest LAA_Node measurement report and/or LAA_UE measurement reports received from the LAA node 102 and the UE 103 respectively.

The disclosure will elucidate steps S601, S602, and S604 of FIG. 6 by providing examples of $RSSI_{LAA}$ measurement/report based on the LAA-MRR configuration. However, the same procedures may also be applied to the UE measurement/report of $RSRP_{LAA}$ and $RSRQ_{LAA}$. Further, the proposed procedures may also be applied for the purpose of channel selection, such that the "LAA-UL Transmission" block is not necessary.

Figure 7A:
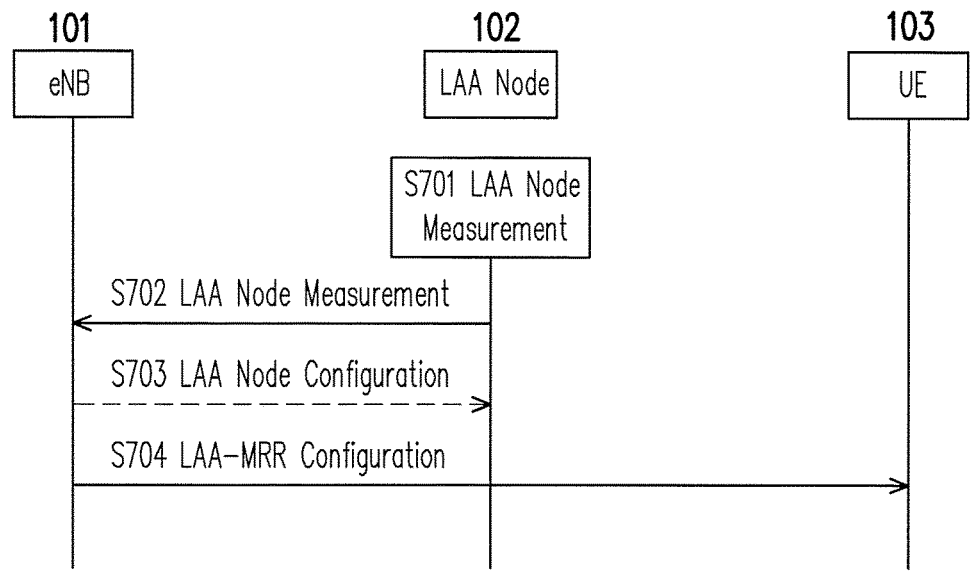
FIG. 7A illustrates a signal flow diagram of LAA-MRR initialization in accordance with one of the exemplary embodiments of the disclosure.

FIG. 7A illustrates a signal flow diagram which expands upon the step of LAA-MRR initialization (e.g. S601) in further detail according to one exemplary embodiment. In step S701, the LAA node (e.g. 102) may perform a measurement (e.g. LAA_Node measurement) to determine the channel quality of one or more channels in the unlicensed frequency spectrum. In step S702, the LAA node 102 may transmit the result of the measurement to the eNB (e.g. 101) which may determine the initial configuration of LAA-MRR through the measurement results of LAA Node 102. Based on the LAA_Node measurement, in step S703, the eNB 101 may configure at least one LAA channel to the LAA Node 102 through the instruction 'LAA_Node configuration'. In step S704, the eNB 101 would deliver the LAA-MRR configuration having parameters not limited to {Channel ID, $T_{LAA\_rpt}, T_{I\_RSSI}, \Delta_{RSSI}, I_M, I_R$} to UE (e.g. 103) through a licensed frequency band or through a LAA channel(s) in an unlicensed frequency band as delayed by the LAA Node 102. In this embodiment the parameter "Channel ID" may include one or more channel numbers to indicate specific channel(s) in the unlicensed frequency spectrum.

Figure 7B:
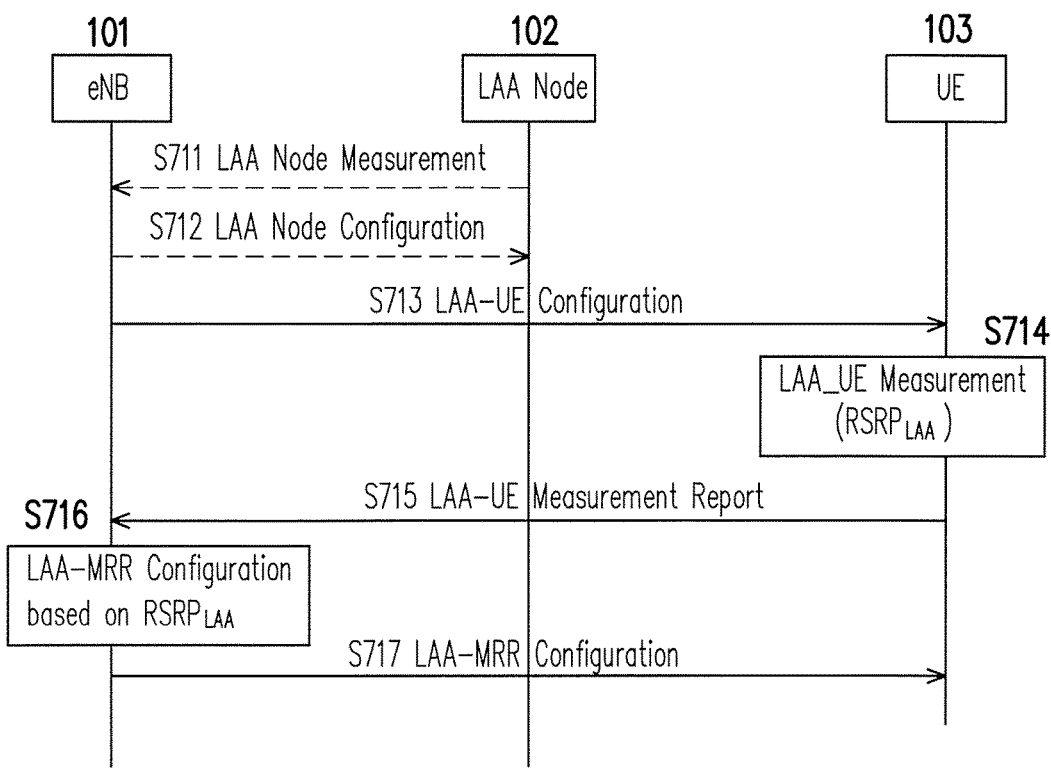
FIG. 7B illustrates a signal flow diagram of LAA-MRR initialization in accordance with another one of the exemplary embodiments of the disclosure.

FIG. 7B illustrates a signal flow diagram which expands upon the step of LAA-MRR initialization (e.g. S601) in further detail according to another exemplary embodiment. In the optional step S711, the LAA node 102 may transmit a LAA_Node measurement, which is similar to S702, to the eNB 101. In the optional step S712, the eNB may transmit a LAA_Node configuration, which is similar to S703, to the LAA node 102. In step S713, the eNB 101 may determine the initial LAA-MRR configuration based on a $RSRP_{LAA}$ measurement result provided by a UE (e.g. 103) with or without the LAA_Node Measurement by transmitting a LAA_UE configuration in which the parameters may include not limited to a channel ID and a UE ID. In this way, the eNB 101 may configure the UE 103 with the coveted unlicensed channel for future communication with 'Channel ID' through the LAA_UE_Configuration message. In step S714, the UE would perform the LAA_UE measurement to obtain the $RSRP_{LAA}$ result which corresponds to the received Channel ID. In step S715, the UE 103 may then report the measurement result, which in addition to $RSRP_{LAA}$ could further include $RSRQ_{LAA}$ and/or $RSSI_{LAA}$ of LAA channel(s) by transmitting a LAA_UE measurement report having parameters not limited to UE ID and $RSRP_{LAA}$ and so forth. (For brevity, the disclosure may simply state $RSRP_{LAA}$ as an example with or without the parameter 'Channel ID'. For an example without reporting 'Channel ID', the eNB 101 may schedule individual radio resources or timing slots for each individual LAA channel measurement reports, or the UE 103 may also report measurement results in the order of Channel ID(s) which the eNB 101 has provided. In response to receiving the first measurement result (e.g. step S715), in step S716 the eNB 101 could then configure the LAA-MRR to the UE 103 through dedicated signaling or broadcasting by transmitting a LAA MRR configuration message having parameters not limited to $\{T_{LAA\_rpt}, T_{I\_RSSI}, \Delta_{RSSI}, I_M, I_R\}$. It is worth noticing that the contents of LAA-MRR configuration differ between the embodiments of FIG. 7A and FIG. 7B as channel ID could be unnecessary in LAA-MRR configuration of FIG. 7B. Also note that the initial LAA-MRR configuration may be derived based on the radio signal sensitivity level of LAA Node 102 or measurement report of LAA Node 102, etc. These may also be estimated by the LAA Node 102 and subsequently delivered to the eNB 101. Moreover, a unique LAA-MRR could be provided to specific UE(s) through dedicated signaling in some cases or through broadcasting such as provided in the System Information Blocks (SIB) provided in the licensed band.

Figure 8:
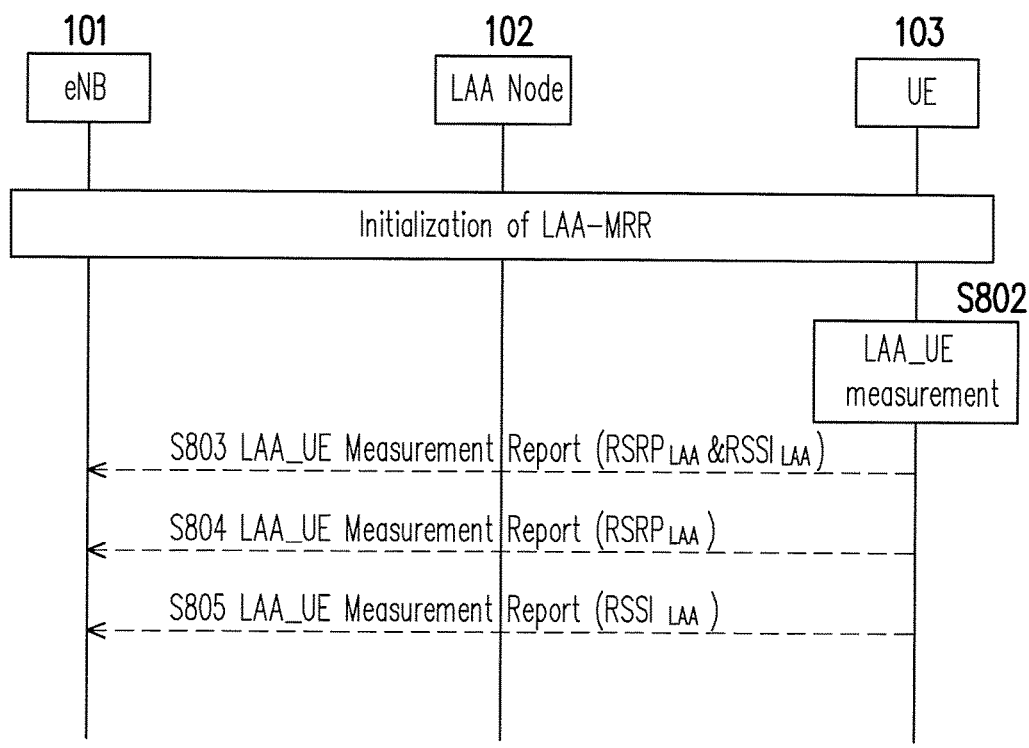
FIG. 8 illustrates a signal flow diagram of a UE transmitting various embodiments of measurement reports in accordance with one of the exemplary embodiments of the disclosure.

FIG. 8 illustrates a signal flow diagram of a UE performing measurements and reports in accordance with one of the exemplary embodiments of the disclosure. In response to the initialization of LAA-MRR being completed, in step S802, the UE may perform the LAA_UE measurement according to initialized parameters of the LAA-MRR. Subsequently, the UE may respond in one of three ways. In the optional step S803, the UE may transmit the LAA_UE measurement report in which the parameters may contain not limited to a UE ID, a $RSRP_{LAA}$ report with $RSSI_{LAA}$ report. Alternatively, the UE may instead implement the optional step S804 by transmitting the LAA_UE measurement report in which the parameters may contain not limited to a UE ID, and a $RSRP_{LAA}$ report. In other words, the LAA_UE measurement report does not include the $RSSI_{LAA}$ report. Alternative, the UE may also instead implement the optional step of S805 by transmitting the LAA_UE measurement report in which the parameters may contain not limited to a UE ID, and a $RSSI_{LAA}$ report. Subsequently, the UE may either autonomously determine the interval to conduct the LAA_UE measurements and the interval to transmit LAA_UE measurement reports, or the eNB would determine $I_{M,RSSI}$ based on LAA_UE measurements. The formerly is further described in FIG. 9, FIG. 10, and their corresponding written descriptions below.

Figure 9:
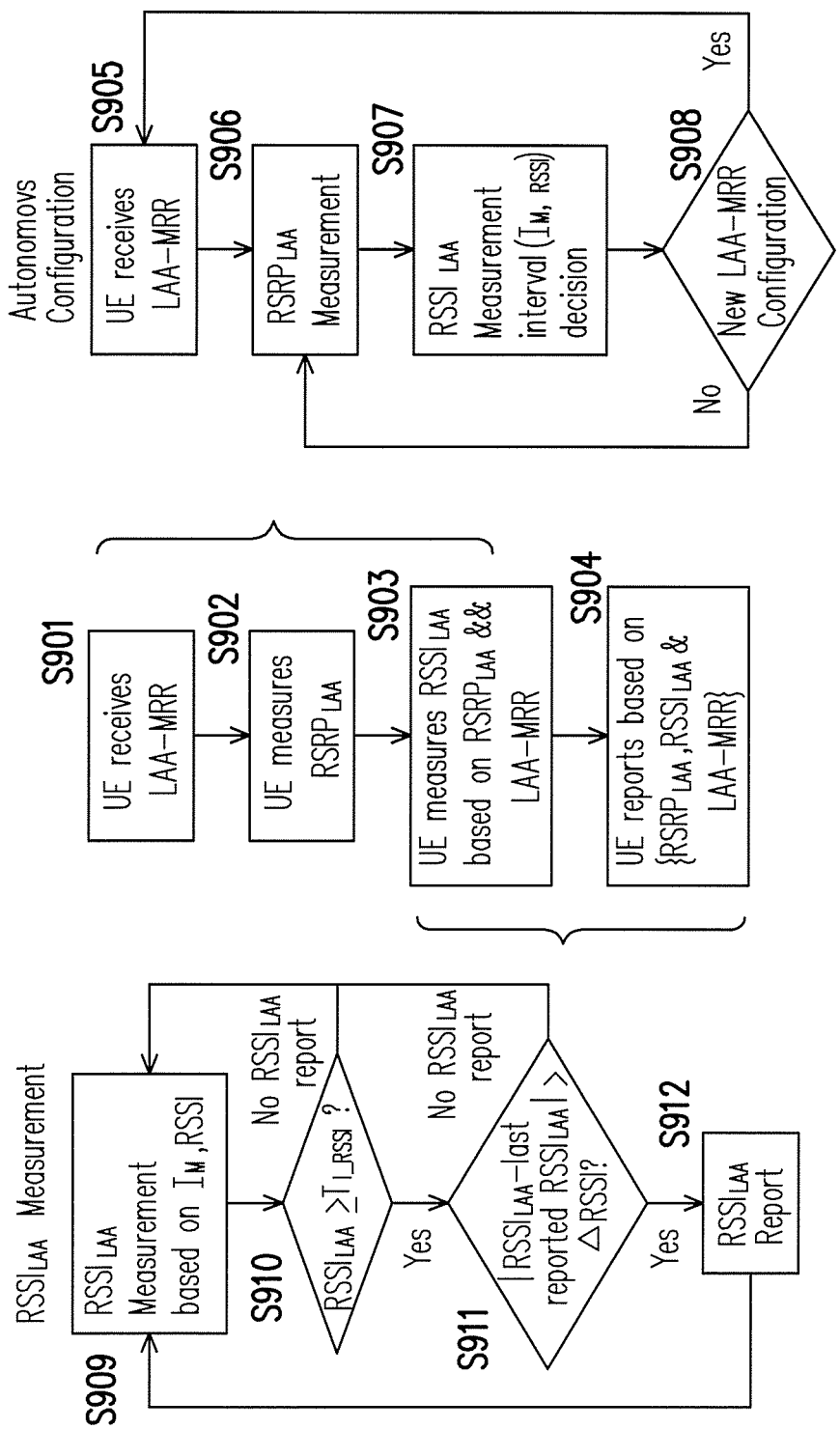
FIG. 9 is a flow chart which illustrates a UE performing measurement and report autonomously in accordance with one of the exemplary embodiments of the disclosure.

FIG. 9 is a flow chart which illustrates a UE performing measurement and report autonomously in accordance with one of the exemplary embodiments of the disclosure. For this exemplary embodiment, the LAA-MRR parameters $\{I_M, I_R\}$ per LAA-MRR configuration may include multiple sets of values (e.g. 520 521 522). UE decides measurement and/or report interval autonomously once it is triggered to measure $RSRQ_{LAA}$ or $RSRP_{LAA}$ or $RSSI_{LAA}$. Therefore, UE may perform measurement and/or deliver report periodically or aperiodically. In step S901, UE receives LAA-MRR configuration. In step S902, the UE would perform $RSRP_{LAA}$ measurement. In step S903, the UE would measure $RSSI_{LAA}$ based on $RSRP_{LAA}$ and LAA-MRR. In step S904, the UE would transmit a measurement report based on parameters not limited to $RSRP_{LAA}$, $RSSI_{LAA}$, and LAA-MRR.

To perform $RSSI_{LAA}$ measurement, the UE would measure $RSRP_{LAA}$ and compares $RSRP_{LAA}$ with the LAA-MRR rules. The UE would then compare the $RSRP_{LAA}$ result with $T_{LAA\_rpt}$ and then select corresponding reporting interval $\{I_M, I_R\}$ based on the comparison. The UE would then perform $RSSI_{LAA}$ measurement once the times of a measuring interval $I_M$ has expired. The UE may compare the measured $RSSI_{LAA}$ the with the $\{T_{I\_RSSI}, \Delta_{RSSI}\}$ in LAA-MRR and then decides whether to perform $RSSI_{LAA}$ reporting or not. For example, the UE may not perform reporting if $\{RSSI_{LAA} \geq T_{I\_RSSI}\}$ and/or {(the variance between current $RSSI_{LAA}$ measurement result and the last $RSSI_{LAA}$ report value)$> \Delta_{RSSI}$}. In some cases, such as the UE of experiencing no or low variety of $RSRP_{LAA}$ due to having static or low mobility, the UE may skip step S902 but instead apply previous acquired $RSRP_{LAA}$ value without measuring new $RSRP_{LAA}$ value. Alternatively, the UE may change the orders of processing, such as measures $RSSI_{LAA}$ first then compares its $RSRP_{LAA}$ value with LAA-MRR.

The steps of one exemplary embodiment of implementing autonomous configuration by the UE are as follows. In step S905, the UE would receive LAA-MRR. In step S906, the UE would perform $RSRP_{LAA}$ measurement. In step S907, the UE would perform $RSSI_{LAA}$ measurement interval ($I_{M,\ RSSI}$) decision by selecting from one set of $\{I_M, I_R\}$. In step S908, the UE would determine the whether the current circumstance require a new LAA-MRR configuration. If yes, then the UE execute step S905, but if no, the UE execute step S906.

The steps of one exemplary embodiment of performing $RSSI_{LAA}$ measurements are as follows. In step S909, the UE would perform $RSSI_{LAA}$ measurement based on $I_{M,RSSI}$. In step S910, the UE would determine whether the measured $RSSI_{LAA}$ is greater than or equal to the threshold $T_{I\_RSSI}$ as defined by the LAA-MRR. If yes, then step S911 is executed; otherwise if no, then no $RSSI_{LAA}$ report is transmitted as step S909 is executed. In step S911, the UE determines whether the absolute value of the measured $RSSI_{LAA}$ subtracted by the previous reported $RSSI_{LAA}$ would exceed $\Delta_{RSSI}$, if so then step S912 is executed; but if not then no $RSSI_{LAA}$ report is transmitted as step S909 is executed. In step S912, the UE would transmit the $RSSI_{LAA}$ report.

Figure 10:
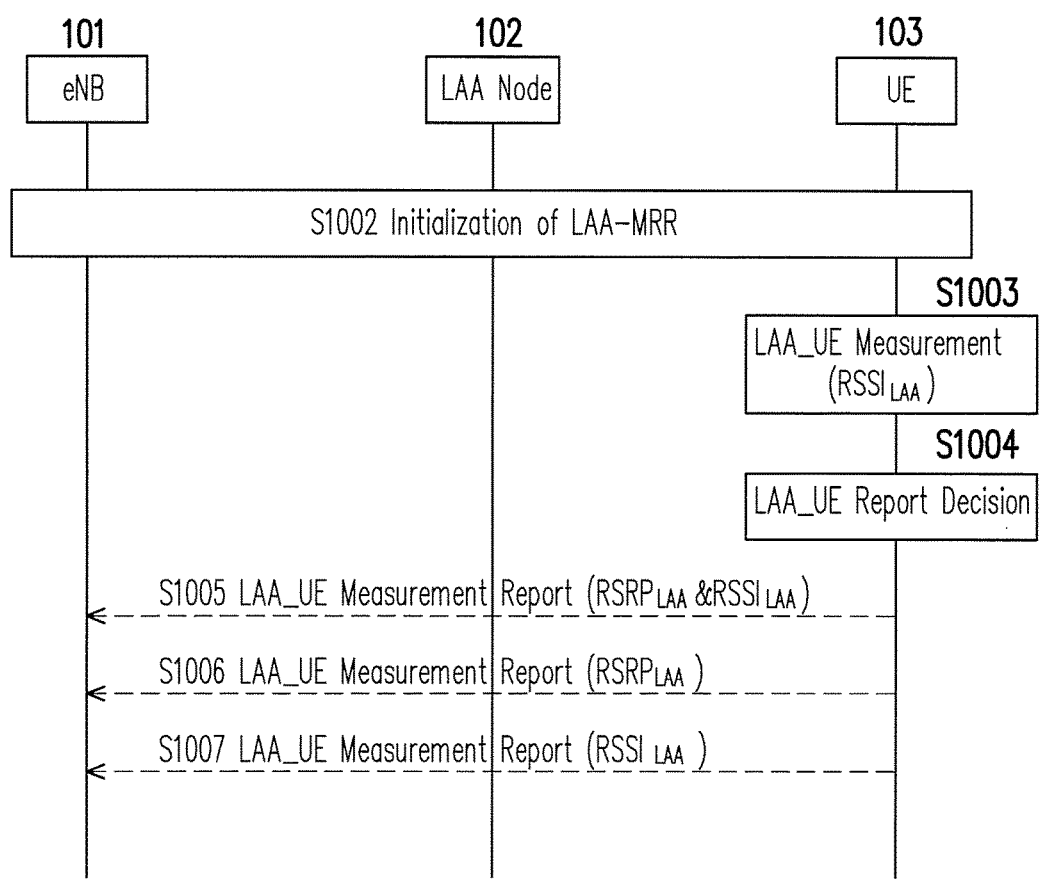
FIG. 10 illustrates a signal flow diagram of a UE autonomously transmitting various embodiments of measurement reports in accordance with one of the exemplary embodiments of the disclosure.

FIG. 10 illustrates a signal flow diagram of a UE transmitting measurement reports as the UE autonomously determine measurement and/or report intervals in accordance with one of the exemplary embodiments of the disclosure. In step S1002, the initialization of LAA-MRR would be accomplished as previously described. Upon the completion of the initialization, the eNB 101 may transmit the LAA-MRR to the UE 103. In step S1003, in response to receiving the LAA-MRR, the UE would conduct LAA_UE measurement for $RSSI_{LAA}$ according to the parameters of LAA-MRR. In step S1004, the UE 103 may select a set of $I_M$, $I_R$ and determine whether or when to transmit the LAA_UE measurement report. Subsequently, the UE 103 may choose among three alternatives to transmit the LAA_UE measurement report. In the optional step S1005, the UE would transmit the LAA_UE measurement report in which the parameters may include not limited to the $RSRP_{LAA}$ & $RSSI_{LAA}$. In the optional step S1006, the UE would transmit the LAA_UE measurement report in which the parameters may include not limited to the $RSRP_{LAA}$ but not $RSSI_{LAA}$. In the optional step S1007, the UE would transmit the LAA_UE measurement report in which the parameters may include not limited to the $RSSI_{LAA}$.

Figure 11:
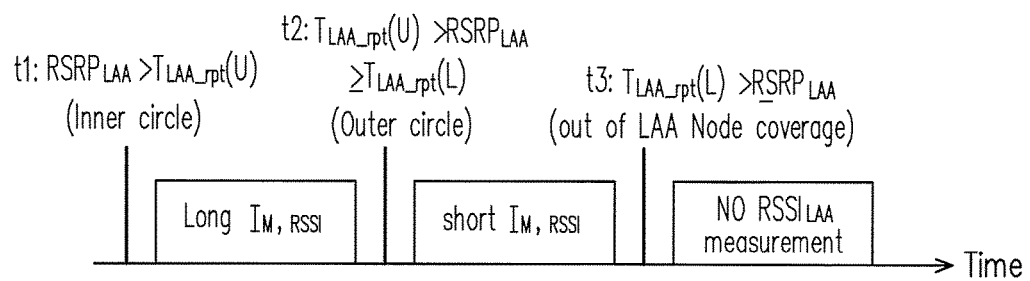
FIG. 11 illustrates the concept of $I_{M,\ RSSI}$ changing with $RSRP_{LAA}$ detected by a UE in accordance with one of the exemplary embodiments of the disclosure.

FIG. 11 illustrates the concept of $I_{M,\ RSSI}$ changing with $RSRP_{LAA}$ detected by a UE in accordance with one of the exemplary embodiments of the disclosure. In this exemplary embodiment, by measuring a first $RSRP_{LAA}$, it would imply that the UE would have a different radio distance between the UE and the LAA Node from a second $RSRP_{LAA}$ measurement. In other words, the first $RSRP_{LAA}$ would indicate that the UE is at a different location from the same UE that measures the second $RSRP_{LAA}$. Consequently, a UE could then apply different measurement interval ($I_M$) and/or reporting interval ($I_R$) for different $RSSI_{LAA}$ measurements. As previously shown in FIG. 5B, if the UE, for example, at t1 detects $RSRP_{LAA} \geq T_{LAA\_rpt}(U)$, then a longer interval of $I_{M,RSSI}$ would be used to report $RSSI_{LAA}$. For example, if the UE subsequently at time t2 detects that $T_{LAA\_rpt}(U) > RSRP_{LAA} \geq T_{LAA\_rpt}(L)$, then the UE would report the next $RSSI_{LAA}$ with a shorter measurement interval as defined by $I_{M,RSSI}$. For example, the UE at time t3 would not provide $RSSI_{LAA}$ measurement/report when the UE detects that $T_{LAA\_rpt}(L) > RSRP_{LAA}$. Thus, the overhead required for the $RSSI_{LAA}$ reporting mechanism would be reduced.

Figure 12:
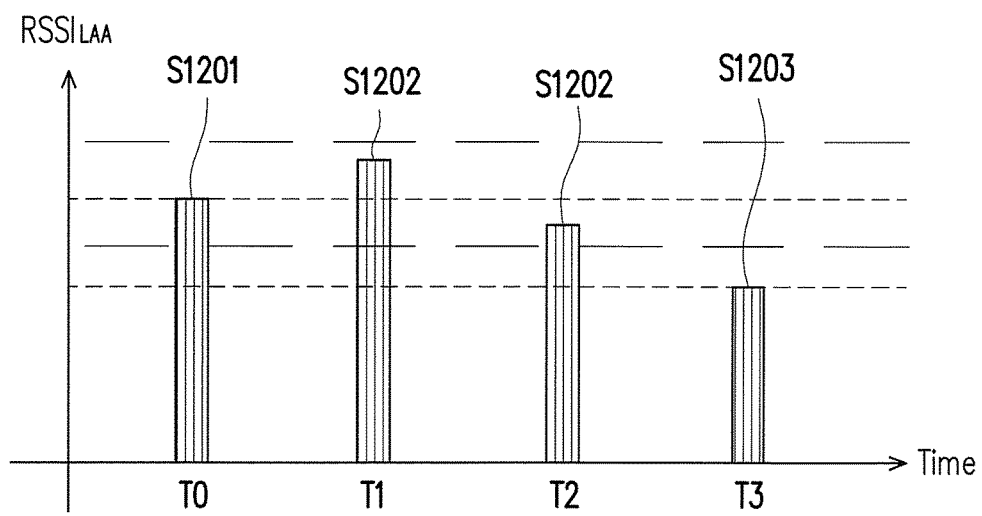
FIG. 12 illustrates the concept of UE determining whether to report $RSSI_{LAA}$ by comparing with the last $RSSI_{LAA}$ reporting record in accordance with one of the exemplary embodiments of the disclosure.

FIG. 12 illustrates the concept of UE determining whether to report $RSSI_{LAA}$ by comparing with the last $RSSI_{LAA}$ reporting record in accordance with one of the exemplary embodiments of the disclosure. In general, a UE may conduct a current $RSSI_{LAA}$ measurement and take the absolute value of the different between the current $RSSI_{LAA}$ measurement with a previous $RSSI_{LAA}$ measurement to obtain the $RSSI_{LAA}$ variance which would then be compared against the $\Delta_{RSSI}$ threshold. The UE may need to perform $RSSI_{LAA}$ reporting if the variance between current measurement report and the last reported $RSSI_{LAA}$ value is larger than $\Delta_{RSSI}$. Otherwise, it may not be necessary for the UE to report $RSSI_{LAA}$ if the variance between current $RSSI_{LAA}$ measurement result and the last reporting $RSSI_{LAA}$ value is smaller than $\Delta_{RSSI}$. In LAA-MRR, the eNB may also configure the UE to not report the $RSSI_{LAA}$ if $T_{L\_RSSI} > RSSI_{LAA}$ as such result indicates that the UE has detected very small interference in the LAA channel. Referring to the example of FIG. 12, at T0, the UE would report $RSSI_{LAA}$ measurement since the $RSSI_{LAA}$ at T0 is greater than $\Delta_{RSSI}$. At T1 and T2 however, the UE would not report $RSSI_{LAA}$ measurements since the $RSSI_{LAA}$ at T1 and T2 does not experience sufficient variations to overcome the $\Delta_{RSSI}$ threshold. At T3, the UE would report $RSSI_{LAA}$ measurement since the $RSSI_{LAA}$ at T3 is greater than $\Delta_{RSSI}$.

Figure 13:
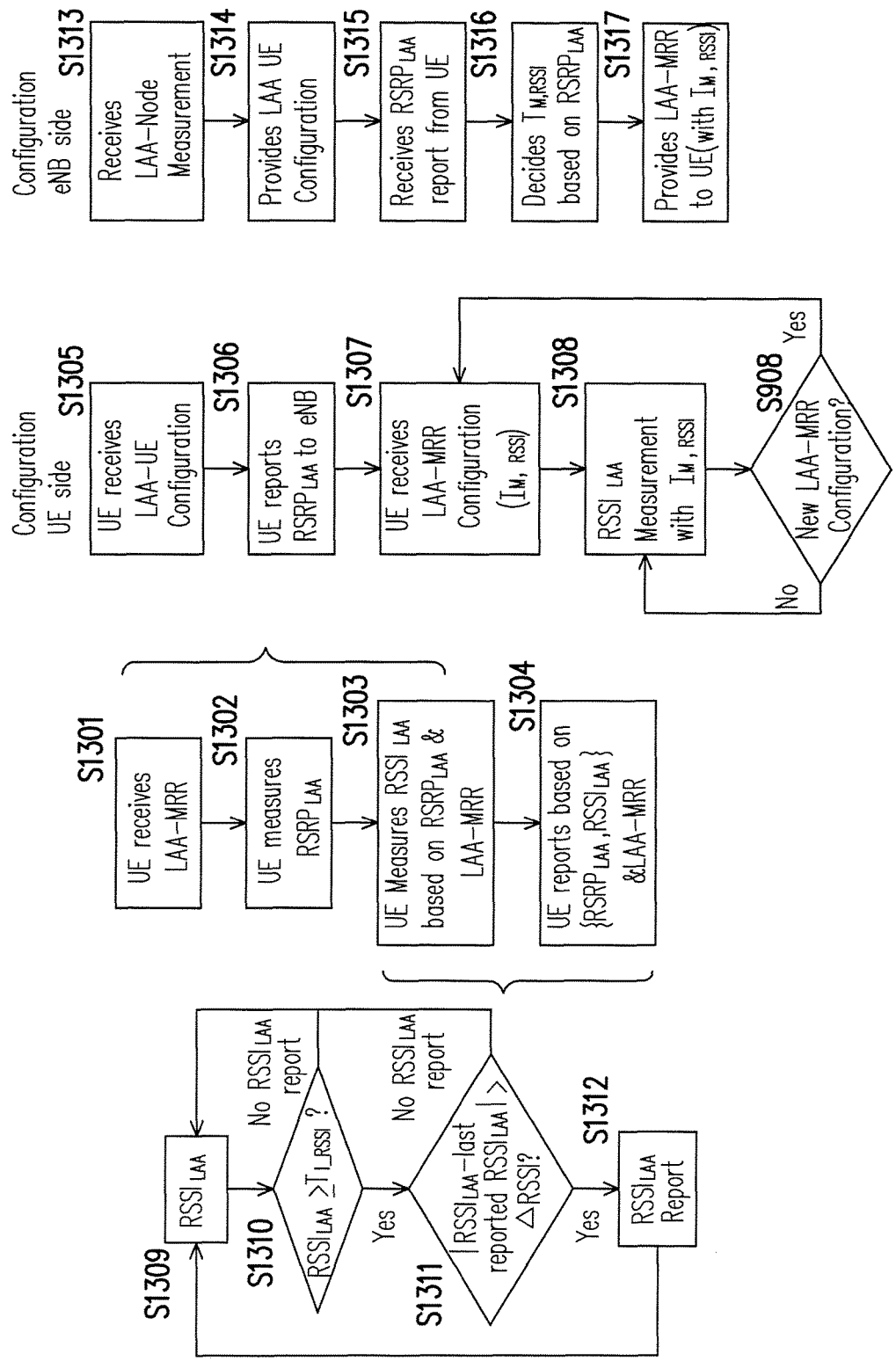
FIG. 13 is a flow chart which illustrates the procedures of an eNB determining $I_M$, RSSI according to LAA_UE measurements in accordance with one of the exemplary embodiments of the disclosure.

FIG. 13 is a flow chart which illustrates the procedures of an eNB determining $I_{M,\ RSSI}$ according to LAA_UE measurements in accordance with one of the exemplary embodiments of the disclosure. But first, the steps involved in the LAA_UE measurements are described. In step S1301, a UE would perform measurement and/or reporting after receiving the LAA-MRR from the serving eNB, i.e. in an event-trigger manner. In step S1302, the UE would measure $RSRP_{LAA}$. In step S1303, the UE would measure $RSSI_{LAA}$ based on $RSRP_{LAA}$ and LAA-MRR. In step S1304, the UE would adhere to the configuration of LAA-MRR while reporting $RSRP_{LAA}$ and/or $RSRQ_{LAA}$ and/or $RSSI_{LAA}$ in the LAA_UE measurement report.

The measurements and reports are dictated by the LAA-MRR which could be configured according to steps S1305~S1308. In step S1305, the UE would receive LAA_UE configuration from the eNB. In step S1306, the UE would report $RSRP_{LAA}$ to eNB. In step S1307, the UE would receive LAA-MRR configuration which would include one or more sets of $I_{M,RSSI}$. In step S1308, the UE would conduct the RSSILAA measurement according to the interval as defined by $I_{M,RSSI}$. Subsequent to the step S1308, the UE would determine whether a new LAA-MRR configuration is required. If so, the UE may receive another LAA-MRR configuration; but if not, the UE may continue measuring $RSSI_{LAA}$ according to the same interval as defined by $I_{M,RSSI}$.

The measurements of $RSSI_{LAA}$ are described in steps S1309~S1312 in further details. In step S1309, the UE would perform the $RSSI_{LAA}$ measurement. In step S1310, the UE would determine whether the $RSSI_{LAA}$ as measured is greater than or equal to the threshold as defined by $T_{L\_RSSI}$. If yes, step S1311 will be executed; but if no, the step S1309 is repeated as the UE will not report the $RSSI_{LAA}$ measurement. In step S1311, the UE would determine whether the absolute value of the $RSSI_{LAA}$ measurement subtracted by the last previous $RSSI_{LAA}$ is greater than the threshold as defined by $\Delta_{RSSI}$. If yes, step S1312 will be executed; but if no, the step S1309 is repeated as the UE will not report the $RSSI_{LAA}$ measurement. In step S1312, the UE would report the measured $RSSI_{LAA}$.

Steps S1313~S1317 describes the eNB determining $I_{M,RSSI}$ based on LAA_UE measurements. In step S1313, the eNB would receive the LAA_UE measurement. In step S1314, the eNB may provide the UE with a LAA_UE configuration. In step S1315, the eNB may receive the $RSRP_{LAA}$ report from the UE. In step S1316, the eNB may determine the $T_{M,RSSI}$ based on $RSRP_{LAA}$. In step S1317, the eNB would provide to the UE the next LAA-MRR which contains the $I_{M,RSSI}$ parameter.

It is worth noting that the UE may only deliver $RSRP_{LAA}$ to UEs in first LAA-MRR configuration. Then, the UE may perform LAA-MRR continuously. In this embodiment, the UE may provide new $RSRP_{LAA}$ measurement results to the eNB when the UE detects notable fluctuation of $RSRP_{LAA}$ and then eNB would re-configure the LAA-MRR to the UE. It is also worth noting that UE may also receive LAA-MRR configuration ($I_{M,RSSI}$) without providing $RSRP_{LAA}$ measurement to eNB.

Figure 14A:
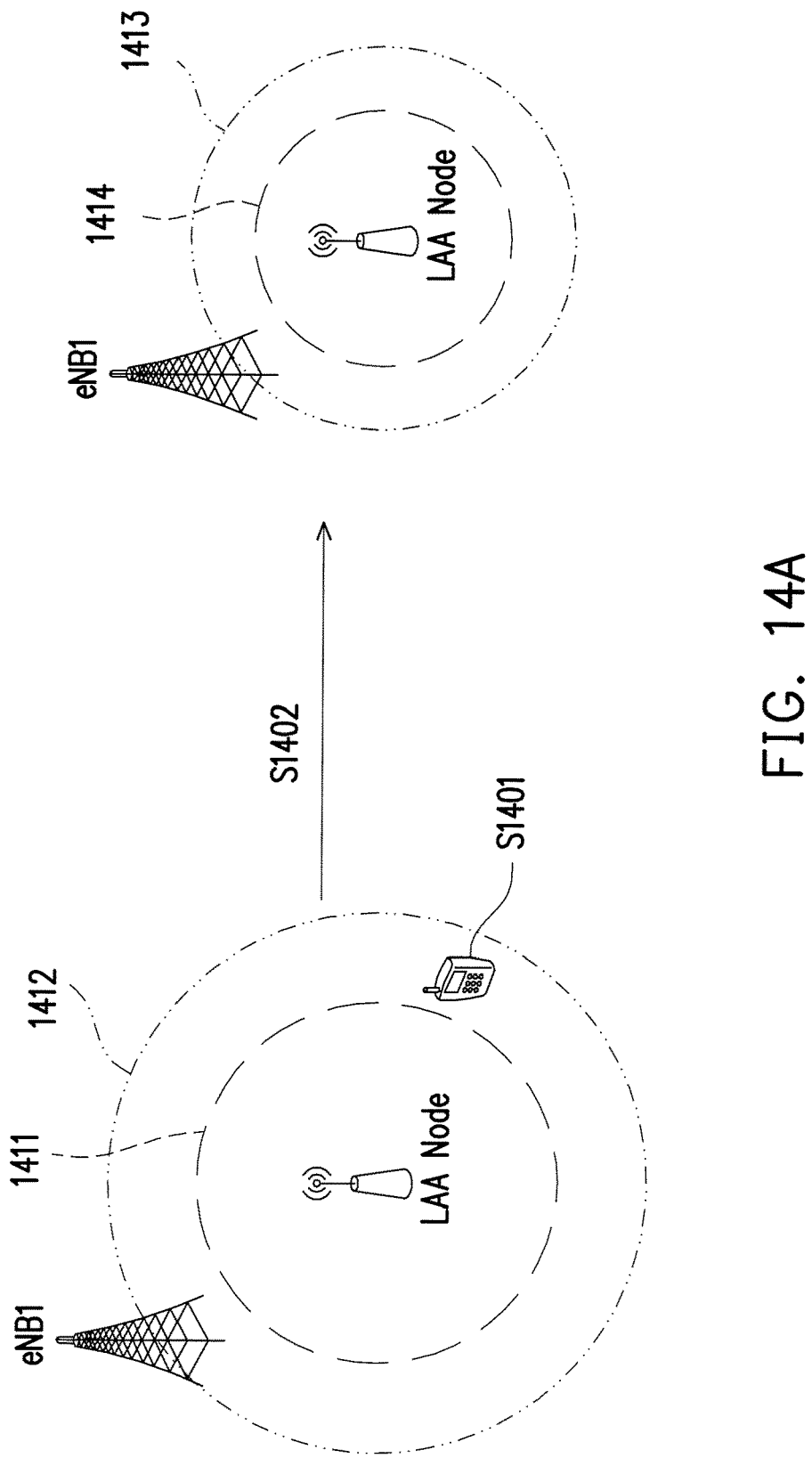
FIG. 14A~FIG. 14F illustrate dynamic LAA-MRR update in accordance with one of the exemplary embodiments of the disclosure.

FIG. 14A~FIG. 14F illustrates dynamic LAA-MRR update in accordance with one of the exemplary embodiments of the disclosure. As shown in FIG. 14A, the eNB may dynamically configure the LAA-MRR to adjust the number of measuring and/or reporting UEs within the service range of the eNB. First, eNB may configure smaller values of $T_{LAA\_rpt}(U)$ threshold associated with a first radio range 1411, as well as $T_{LAA\_rpt}(L)$ threshold associated with a first radio range 1412. If many UEs, being away from the LAA node with long radio distance with low $RSRP_{LAA}$ value, report high $RSSI_{LAA}$ in an environment with high interference to the eNB. Thus in step S1401, assuming that such the UE between the first radio range 1411 and the second radio range 1412 detects strong $RSSI_{LAA}$, the eNB in step S1402 would shrink the service ranges of the first radio range 1411 and the second radio range 1412 to be the third radio range 1413 and fourth radio range 1414 so as to shrink the $RSRP_{LAA}$ reporting area. In this way, UEs that experience strong interferences could excluded from the service range of LAA Node. In other words, the eNB would not to serve these UEs that experience strong interferences over LAA channels.

Figure 14B:
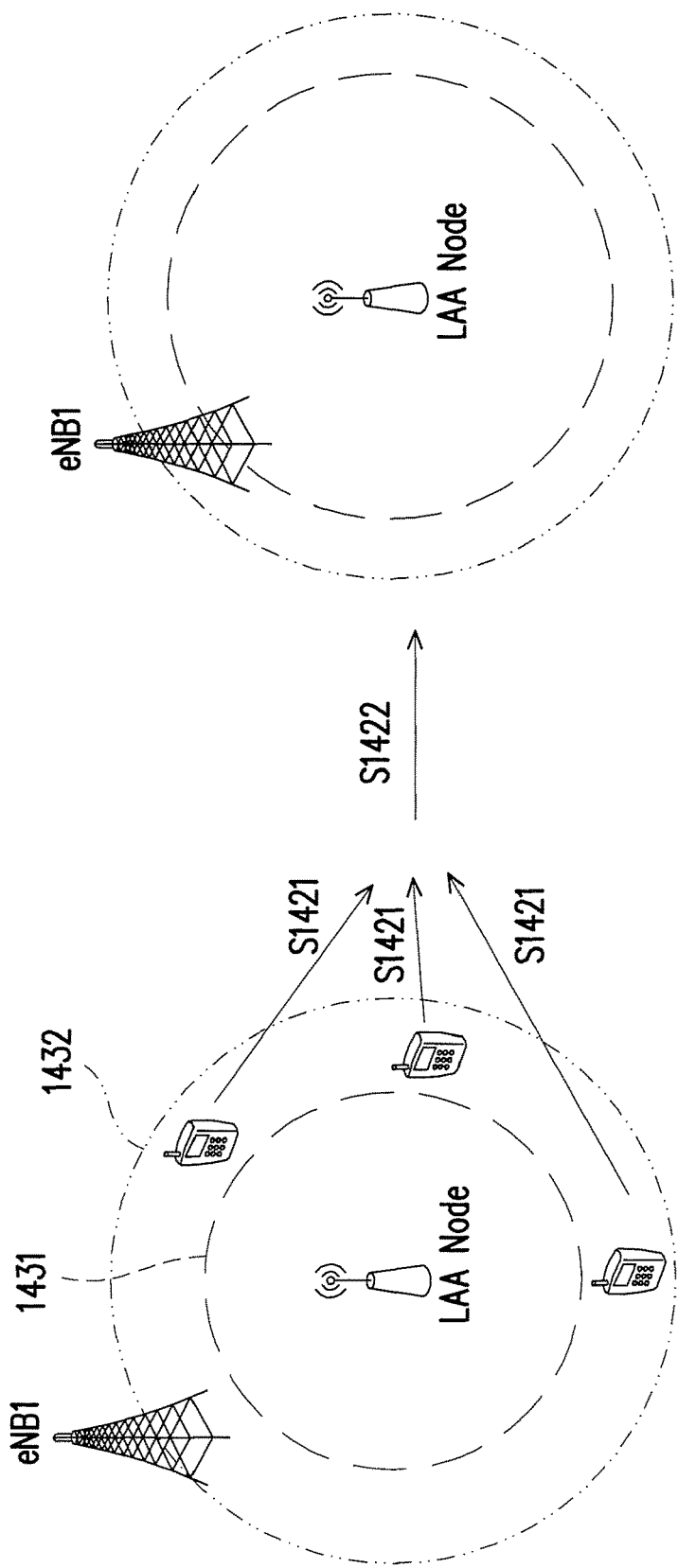
Figure 14C:
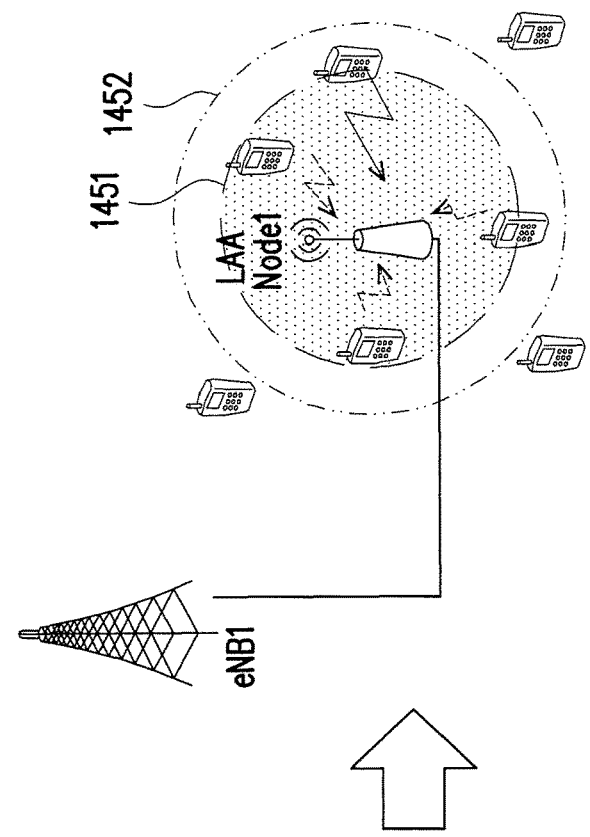
Figure 14C:
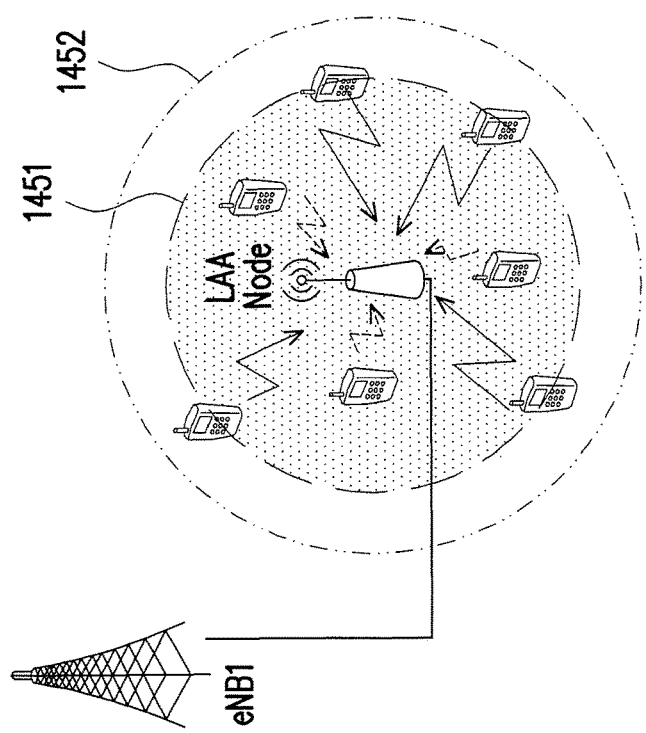

Otherwise, as shown in FIG. 14B, the eNB may configure the $T_{LAA\_rpt}$ threshold associated with the first range 1431 with a lower $T_{LAA\_rpt}(U)$ value in order to reduce the number of $RSSI_{LAA}$ measurements to UEs if many UEs, being away from the LAA node with long radio distance and with low $RSRP_{LAA}$ value, reports low $RSSI_{LAA}$ to the eNB. It is also possible for the eNB to achieve the goal of access control or load-balancing by dynamically configuring the LAA-MRR to its serving UEs, such as to increase or decrease the LAA-involved UE(s) by configuring different $RSRP_{LAA}$ thresholds. Thus in step S1421, if many UEs have detected weak $RSSI_{LAA}$ and thus weak interferences, then in step S1422, the eNB may increase the first range 1431 as the second range 1433 so as to decrease the number (quantity) of $RSSI_{LAA}$ measurements performed per UE. The concepts of FIG. 14A and FIG. 14B are further elucidated in FIG. 14C~FIG. 14F.

FIG. 14C~FIG. 14F illustrates dynamic LAA-MRR update in accordance with another one of the exemplary embodiments of the disclosure. In the exemplary embodiment of FIG. 14C, the eNB may simultaneously decrease the $T_{LAA\_rpt}(U)$ as well as $T_{LAA\_rpt}(L)$ values. The decrease of $T_{LAA\_rpt}(U)$ threshold would cause the first radio distance 1451 within which the longer reporting interval, $I_M$, is selected by the UE to be smaller. The decrease of $T_{LAA\_rpt}(L)$ threshold would cause second first radio distance 1452 within which the shorter reporting interval, $I_M$, is selected by the UE to be smaller. In this way, there would be less UEs within the service range of the LAA Node as the eNB would be able to service a smaller quantity of UEs in the unlicensed spectrum.

Figure 14D:
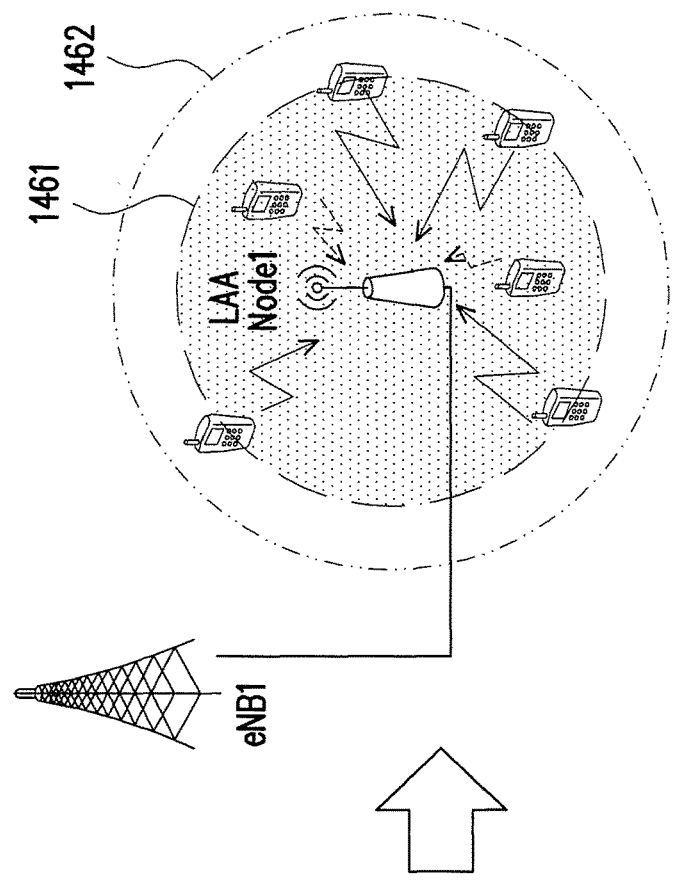
Figure 14D:
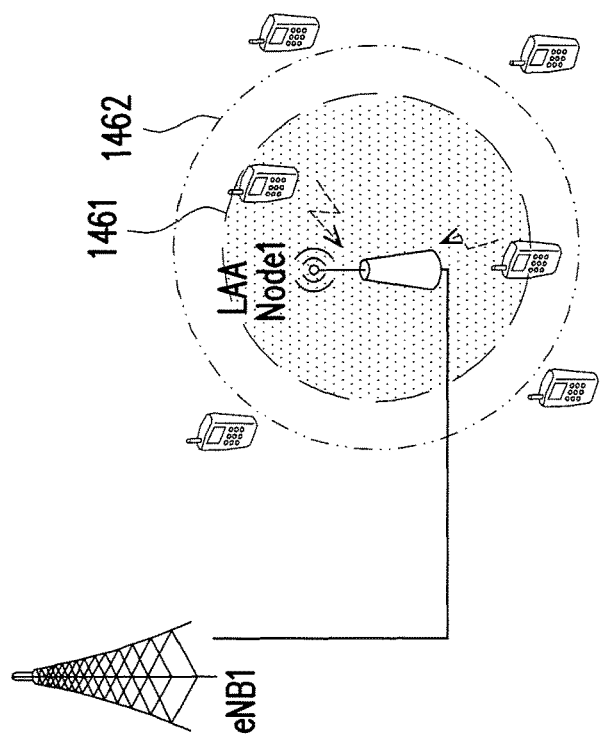

On the other hand, as shown in FIG. 14D, the eNB may simultaneously increase the $T_{LAA\_rpt}(U)$ as well as $T_{LAA\_rpt}(L)$ values. The increase of $T_{LAA\_rpt}(U)$ threshold would cause the first radio distance 1461 within which the longer reporting interval, $I_M$, is selected by the UE to be larger. The increase of $T_{LAA\_rpt}(L)$ threshold would cause second radio distance 1462 within which the shorter reporting interval, $I_M$, is selected by the UE to be larger. In this way, there would be more UEs within the service range of the LAA Node as the eNB would be able to service a larger quantity of UEs in the unlicensed spectrum.

Figure 14E:
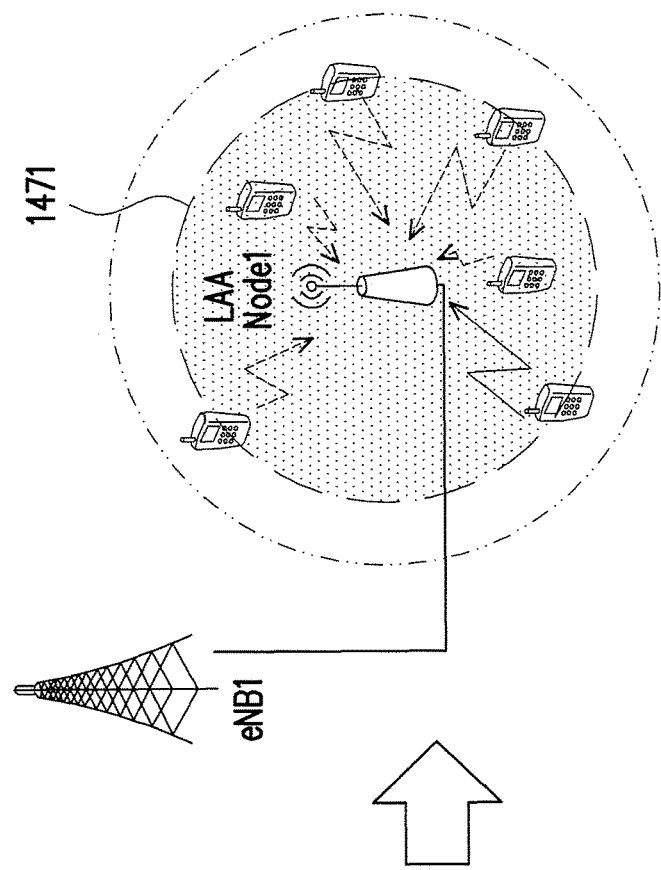
Figure 14E:
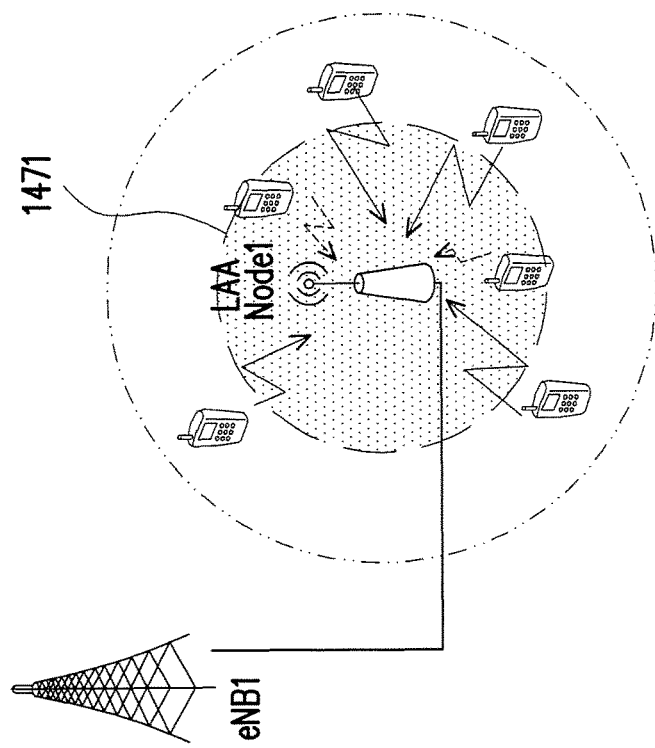
Figure 14F:
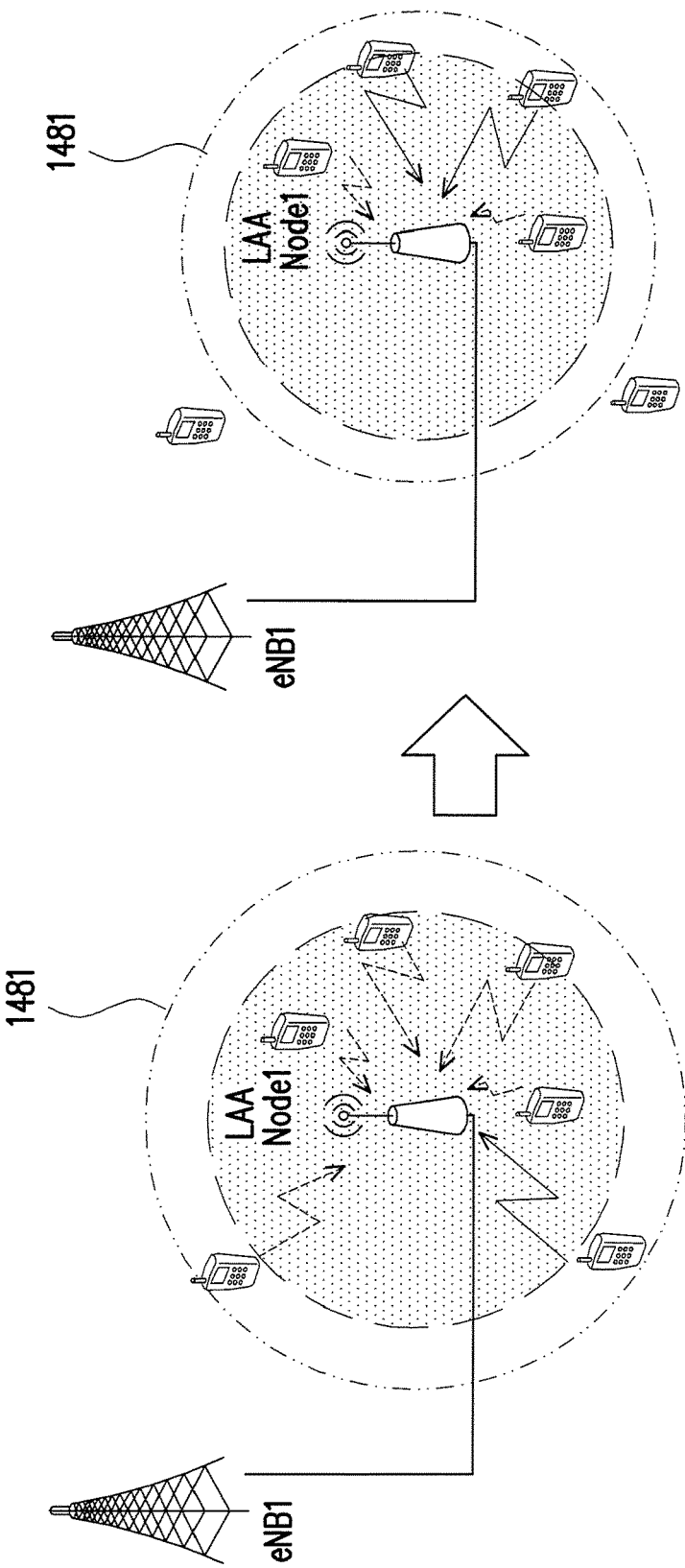

In one of the exemplary embodiments as shown in FIG. 14E, the inner circle or the second radio distance 1471, could be increased by decreasing the $I_{LAA\_rpt}(U)$ threshold. This exemplary embodiment could be helpful if the variation of $RSSI_{LAA}$ measurement is small. For the exemplary embodiment as shown in FIG. 14F, the outer circle or the first radio distance 1481 could be decreased by increasing the $T_{LAA\_rpt}(L)$ threshold. This exemplary embodiment could be helpful to decrease the frequency of the UEs to report the $RSSI_{LAA}$ measurement result.

Figure 15:
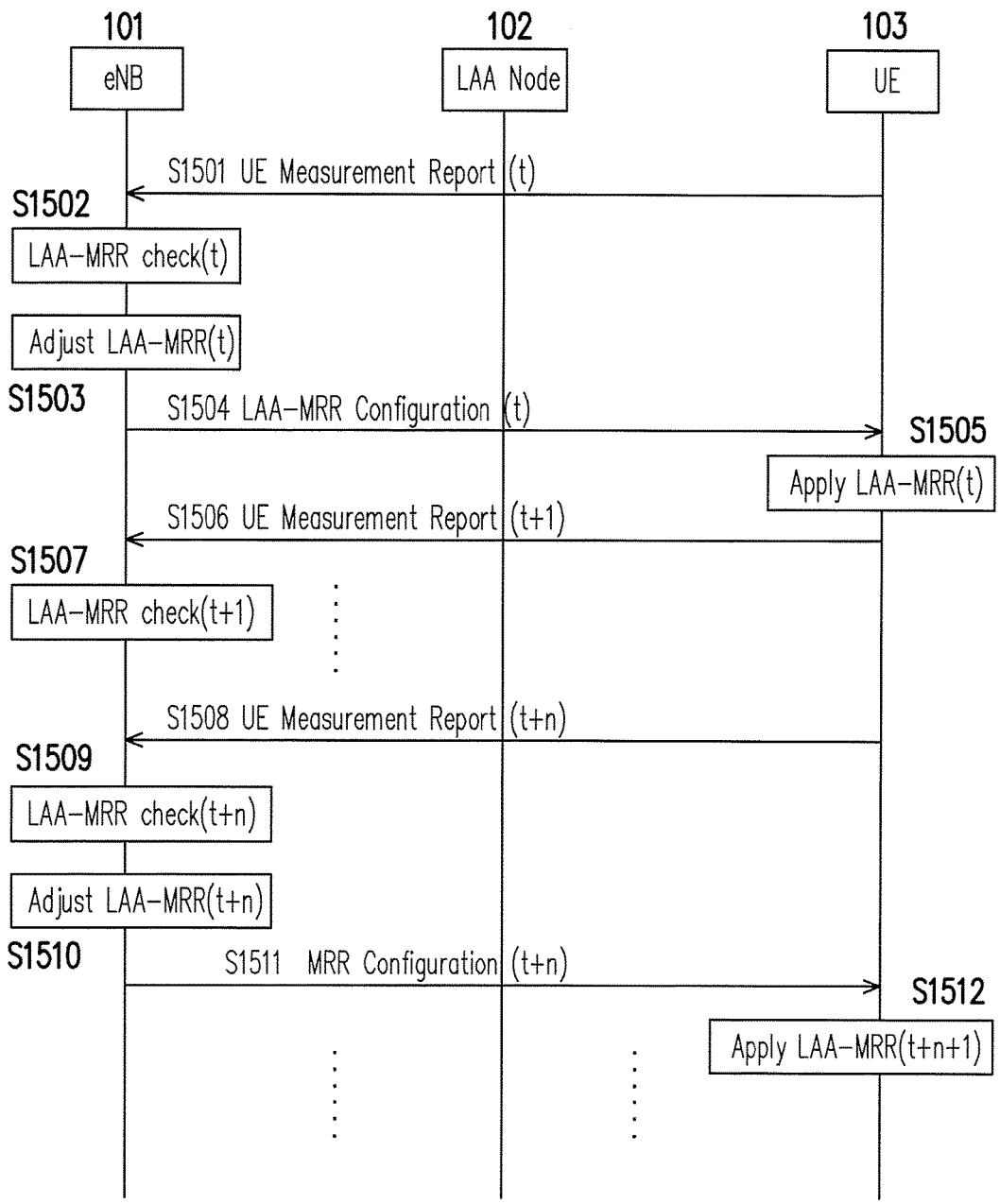
FIG. 15 is a signal diagram which illustrates LAA-MRR update in accordance with one of the exemplary embodiments of the disclosure.

FIG. 15 is a signal diagram which illustrates LAA-MRR update in accordance with another one of the exemplary embodiments of the disclosure. In step S1501, the UE 103 may transmit a measurement report in which the parameters include not limited to UE ID, $RSRP_{LAA}$, $RSSI_{LAA}$ within the time interval t. In step S1502, the eNB 101 would determine whether the LAA-MRR has to be updated based on the measurement report received from step S1501 within the time interval t. In step S1503, the eNB 101 may decide to adjust the LAA-MRR within the time interval t. In step S1504, the eNB 101 may transmit a LAA-MRR configuration in which the parameters include not limited to Channel ID, $T_{LAA\_rpt}$, $T_{I\_RSSI}$, $\Delta_{RSSI}$, $I_M$, and $I_R$ within the time interval t. In step S1505, the UE 103 would apply the LAA-MRR configuration as received in step S1504 within the time interval t+1. In step S1506, the UE 103 would conduct measurements and transmit a measurement report in which the parameters include not limited to UE ID, $RSRP_{LAA}$, $RSSI_{LAA}$ within time interval t+1. In step S1507, the eNB 101 would determine whether to update the LAA-MRR within the time interval t+1 while the UE 103 would perform measurements of LAA channels. In step S1508, the UE would transmit a UE measurement report in which the parameters include not limited to UE ID, $RSRP_{LAA}$, $RSSI_{LAA}$ within the time interval t+n, where n can be positive integer such as {1, 2 . . . } such that the step S1507 and step S1508 could be repeated several times. In step S1509, the eNB 101 would determine whether to update the LAA-MRR. In step S1510, the eNB 101 may adjust the LAA-MRR within. In step S1501, the eNB 101 may transmit a next LAA-MRR configuration in which the parameters include not limited to Channel ID, $T_{LAA\_rpt}$, $T_{I\_RSSI}$, $\Delta_{RSSI}$, $I_M$, and $I_R$ so that in step S1512, the UE 103 may apply the LAA-MRR configuration.

According to one of the exemplary embodiments, the eNB may adjust the frequency to update the LAA-MRR parameters such as by adjusting the length of the interval n which could be a fixed number or a variable number. The eNB may also adjust the number of measurement reports to be received by configuring number of reports of certain designated UEs or by configuring the total number of reports of all UEs served by the eNB.

According to one of the exemplary embodiments, in LAA, a UE may measure and report LAA channels to an eNB for LAA channel selection, and the UE may need to measure multiple LAA channels because there could be many candidate LAA channels for eNB to select. It is worth noting that the LAA node would also measure and report LAA channel condition to the eNB. However, the LAA may periodically broadcast reference signals such as discovery signals (DRS) of LTE in the occupied LAA channel. The LAA service could be defined as a service data flow which is realized in an unlicensed channel.

According to one of the exemplary embodiments, an eNB may dynamically configure the LAA-MRR to adjust the number of measuring and/or report UE but not necessarily within its service range. And also the LAA-MRR may be provided to UE dedicatedly such as through dedicated signaling in some cases or through broadcasting such as provided in the System Information Blocks (SIB) provided in the licensed band. The eNB may shrink the service range and so the $RSRP_{LAA}$ reporting area so as to exclude strong interfered UEs from the service range of LAA Node, i.e. eNB would not to serve these UE over the LAA channel. It is worth noting that it may also be possible for the eNB to achieve the goal of access control or load-balancing by dynamically configuring the LAA-MRR to its serving UEs such as to increase or decrease the LAA-involved UE(s) by configuring different $RSRP_{LAA}$ thresholds.

According to one of the exemplary embodiments, parameters within a measurement report could be increased through dedicated signaling which could be used to alter the behavior of measurement report. For example, the eNB may designate a number of UEs to change behaviors of measurement report through dedicated signaling. The eNB may designate a number of UEs to configure various parameters. The eNB may also configure various parameters that correspond to different channel IDs. The eNB may also configure various parameters for different LAA Nodes. For example, different LAA nodes could be distinguished by the DRS.

In addition to using SIB, dedicated signaling could be used to designate a number of UEs to alter reporting behavior. For example, designated signal could be considered to have high priority and can override normal reporting rules. Moreover, LAA-MRR may contain a handover command. A paging message may include a LAA-MRR modification bit. In this way, only UE which can access LAA service or is LAA capable would need to receive LAA-MRR updates.

Figure 16:
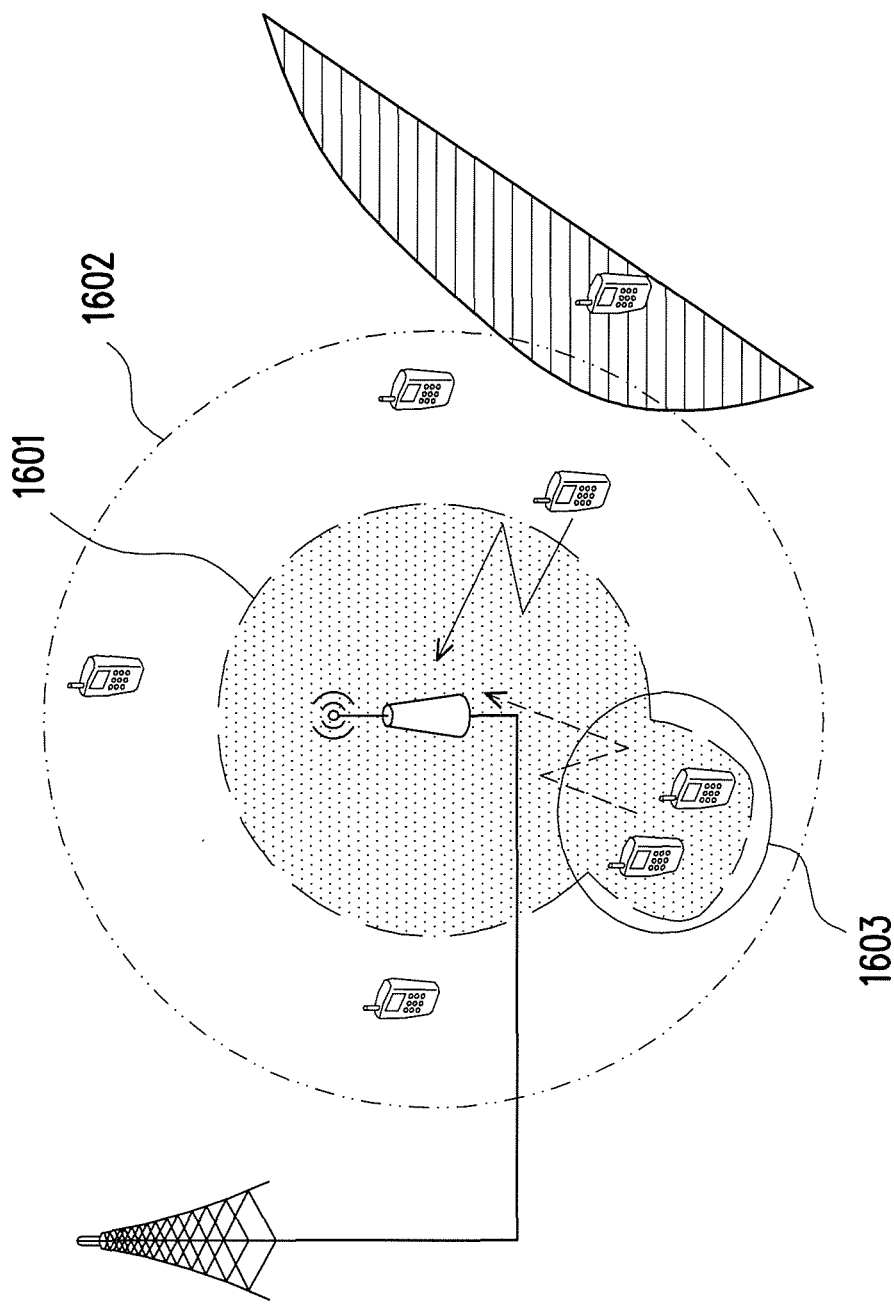
FIG. 16 illustrates the concept of parameter overwrites by dedicated signaling in accordance with one of the exemplary embodiments of the disclosure.

FIG. 16 illustrates the concept of parameter overwrites by dedicated signaling in accordance with one of the exemplary embodiments of the disclosure. For the exemplary embodiment of FIG. 16, UEs within the first radio range 1601 would select a longer reporting interval whereas UEs between the first radio range 1601 and the second radio range 1602 would select a shorter reporting interval. However, dedicated signaling could be utilized such that although UEs 1603 are situated between the first radio range 1601 and the second radio range 1602, these UEs could nevertheless be configured with a longer reporting interval.

According to one of the exemplary embodiments, in addition to the radio distance, a UE may not necessarily monitor and/or report unlicensed channel condition frequently if the UE observes no significant environment changes. For example, if the $\Delta_{RSSI}$ threshold has not been exceeded, the UE could choose not to report at all. Similarly, if the $\Delta_{RSSI}$ threshold has not been exceeded, the UE may choose to reduce the number of measurement reports by a factor of X where X is a positive integer. For example, if a measured value of RSSI of a UE does not exceed the $\Delta_{RSSI}$ threshold within two consecutive time periods, the UE would only transmit a measurement report once.

According to one of the exemplary embodiments, the UE may contend for UL resource. An eNB/LAA node may use Semi-persistent scheduling method to control UL resource. A UE can determine whether to transmit a measurement report according to the RSSI variance. The eNB/LAA node may also adjust the method of Semi-persistent scheduling according to the situation of the UE.

Figure 17A:
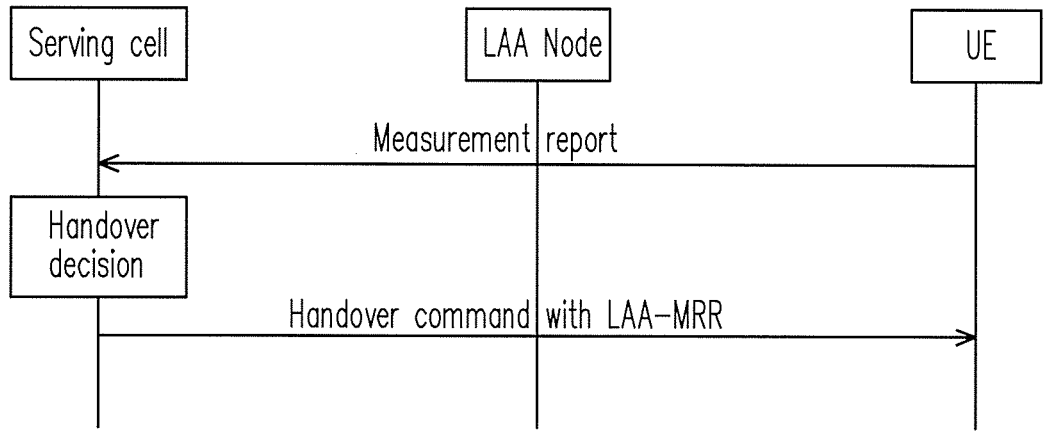
FIG. 17A illustrates LAA-MRR configuration through dedicated signaling and handover commend in accordance with one of the exemplary embodiments of the disclosure.

FIG. 17A illustrates LAA-MRR configuration through dedicated signaling and handover commend in accordance with one of the exemplary embodiments of the disclosure. For this exemplary embodiment, the serving eNB may provide a handover command to a UE with LAA-MRR. The serving cell may decide the LAA-MRR based on measurement report from UE such as RSSI, RSRP, RSRQ of the target cell of the UE.

Figure 17B:
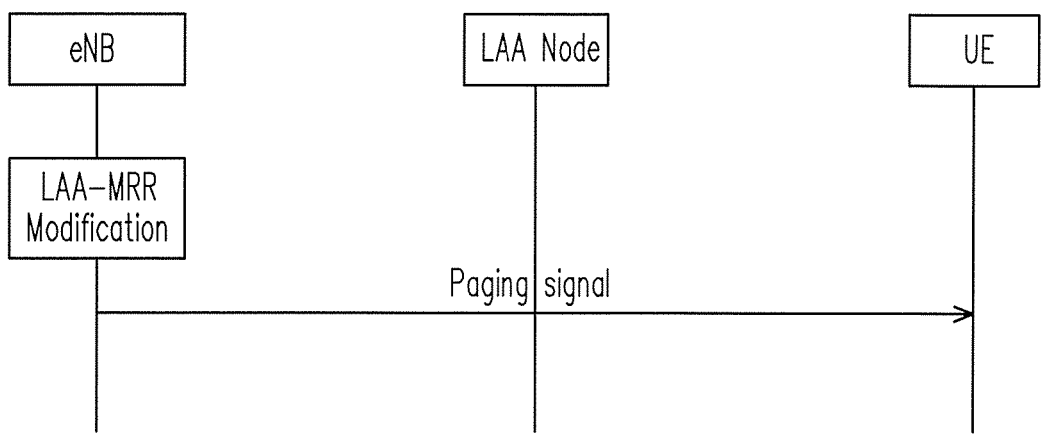
FIG. 17B illustrates LAA-MRR configuration through page signaling in accordance with one of the exemplary embodiments of the disclosure.

FIG. 17B illustrates LAA-MRR configuration through page signaling in accordance with one of the exemplary embodiments of the disclosure. For this exemplary embodiment, the eNB may provide LAA-MRR with paging signaling to require paged terminal(s) to update the LAA-MRR. To UEs which are in the RRC_idle state but it still need to select a LAA Node for packet reception (for example, LAA Node is broadcasting MBMS and so UE can receive it even it is in idle state). The LAA-MRR is encoded with P-RNTI and so UE need to decode LAA-MRR by using specific P-RNTI and so paging signal can be regarded as a dedicated signaling.

In view of the aforementioned descriptions, the present disclosure is suitable for being used by a cellular network to assist a UE and a LAA Node to access LAA channels of unlicensed spectrums regardless of what the ranges of un-licensed bands in each country are. Moreover the proposed measurement and report rules would decrease the overhead of LAA channel measurement and reports.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of controlling a heterogeneous network, applicable to a base station, the method comprising:
   transmitting a first configuration message comprising a measurement and report rule (MRR) which comprises a first measuring interval, a second measuring interval, a first reporting interval, and a second reporting interval for receiving a measurement report of a channel of an unlicensed spectrum, wherein the first measuring interval is longer than the second measuring interval, and the first reporting interval is longer than the second reporting interval;
   receiving the measurement report of the channel of the unlicensed spectrum after transmitting the first configuration message; and
   transmitting a second configuration message to update the measurement and report rule,
   wherein the MRR further comprises a reference signal received power (RSRP) threshold or a reference signal received quality (RSRQ) threshold for selecting the first reporting interval or the second reporting interval.

2. The method of claim 1, wherein the MRR further comprises a received signal strength indicator (RSSI) threshold and a RSSI variation threshold for determining whether to transmit the measurement report.

3. The method of claim 1, wherein receiving the measurement report comprises:
   receiving the measurement report which comprises a received signal strength indicator (RSSI) measurement of the channel of the unlicensed spectrum, a RSRP measurement of the channel of the unlicensed spectrum, and a RSRQ measurement of the channel of the unlicensed spectrum.

4. The method of claim 3 further comprising:
updating the MRR according to the RSRP measurement of the channel of the unlicensed spectrum from the measurement report by adjusting the RSRP threshold or the RSRQ threshold, wherein the RSRP threshold comprises an upper RSRP threshold and a lower RSRP threshold.

5. The method of claim 4, wherein updating the MRR according to the RSRP measurement by adjusting the RSRP threshold comprising:
decreasing the upper RSRP threshold or the lower RSRP threshold in response to receiving the measurement report so as to receive less different measurement reports.

6. The method of claim 4, wherein updating the MRR according to the RSRP measurement by adjusting the RSRP threshold comprising:
increasing the upper RSRP threshold or the lower RSRP threshold in response to receiving the measurement report so as to receive more different measurement reports.

7. The method of claim 4, wherein updating the MRR according to the RSRP measurement by adjusting the RSRP threshold comprising:
decreasing the upper RSRP threshold in response to receiving the measurement report so as to decrease a frequency of receiving the measurement report.

8. The method of claim 4, wherein updating the MRR according to the RSRP measurement by adjusting the RSRP threshold comprising:
decreasing the lower RSRP threshold in response to receiving the measurement report so as to decrease a quantity of measurement reports.

9. A method of controlling a heterogeneous network, applicable to a user equipment (UE), the method comprising:
receiving a first configuration message comprising a measurement and report rule (MRR) which comprises a first measuring interval, a second measuring interval, a first reporting interval, and a second reporting interval for transmitting a measurement report of a channel of an unlicensed spectrum, wherein the first measuring interval is longer than the second measuring interval, and the first reporting interval is longer than the second reporting interval;
transmitting the measurement report of the channel of the unlicensed spectrum in response to receiving the first configuration message; and
receiving a second configuration message to update the measurement and report rule,
wherein the MRR further comprises a reference signal received power (RSRP) threshold or a reference signal received quality (RSRQ) threshold for selecting the first reporting interval or the second reporting interval.

10. The method of claim 9, wherein the MRR further comprises a received signal strength indicator (RSSI) threshold and a RSSI variation threshold for determining whether to transmit the measurement report.

11. The method of claim 10, wherein the RSRP threshold comprises an upper RSRP threshold and a lower RSRP threshold, and claim 10 further comprising:

performing a RSRP measurement; and
selecting the first measuring interval and the first reporting interval in response to the RSRP measurement being greater than the upper RSRP threshold.

12. The method of claim 11 further comprising:
selecting the second measuring interval and the second reporting interval in response to the RSRP measurement being less than the upper RSRP threshold but greater than the lower RSRP threshold.

13. The method of claim 12, wherein the MRR further comprises a third measuring interval and a third reporting interval, wherein the third measuring interval is longer than the first measuring interval and the third reporting interval is longer than the first reporting interval, and claim 12 further comprising:
selecting the third measuring interval and the third reporting interval in response to the RSRP measurement being less than the lower RSRP threshold.

14. The method of claim 12 further comprising:
performing a RSSI measurement;
transmitting no RSSI report in response to the RSSI measurement being less than the RSSI threshold;
transmitting no RSSI report in response to an absolute value of the RSSI measurement subtracted by a previous RSSI measurement being less than the RSSI variation threshold; and
transmitting the RSSI report in response to the RSSI measurement being greater than the RSSI threshold and the absolute value of the RSSI measurement subtracted by the previous RSSI measurement being greater than the RSSI variation threshold.

15. The method of claim 11, further comprising:
performing another RSRP measurement; and
performing an autonomous measurement interval or report interval decision in response to the performing the another RSRP measurement.

16. The method of claim 11, further comprising:
performing another RSRP measurement;
transmitting the another RSRP measurement in the measurement report; and
receiving the second configuration message based on the measurement report.

17. A base station comprising:
a transmitter;
a receiver; and
a processor coupled to the transmitter and the receiver and is configured at least for:
transmitting a first configuration message comprising a measurement and report rule (MRR) which comprises a first measuring interval, a second measuring interval, a first reporting interval, and a second reporting interval for receiving a measurement report a channel of an unlicensed spectrum, wherein the first measuring interval is longer than the second measuring interval, and the first reporting interval is longer than the second reporting interval;
receiving the measurement report of the channel of the unlicensed spectrum after the first reporting interval or the second reporting interval; and
transmitting a second configuration message to update the measurement and report rule,
wherein the MRR further comprises a reference signal received power (RSRP) threshold or a reference signal received quality (RSRQ) threshold for selecting the first reporting interval or the second reporting interval.

18. A user equipment comprising:
a transmitter;
a receiver; and
a processor coupled to the transmitter and the receiver and is configured at least for:
- receiving a first configuration message comprising a measurement and report rule (MRR) which comprises a first measuring interval, a second measuring interval, a first reporting interval, and a second reporting interval for transmitting a measurement report a channel of an unlicensed spectrum, wherein the first measuring interval is longer than the second measuring interval, and the first reporting interval is longer than the second reporting interval;
- transmitting the measurement report of the channel of the unlicensed spectrum after the first reporting interval or the second reporting interval; and
- receiving a second configuration message to update the measurement and report rule, wherein the MRR further comprises a reference signal received power (RSRP) threshold or a reference signal received quality (RSRQ) threshold for selecting the first reporting interval or the second reporting interval.

\* \* \* \* \*